(12) United States Patent
Battles et al.

(10) Patent No.: US 9,751,693 B1
(45) Date of Patent: Sep. 5, 2017

(54) AUTOMATED SHIPMENT SET ITEM CONSOLIDATION

(71) Applicant: Amazon Technologies, Inc., Seattle, WA (US)

(72) Inventors: Jon Stuart Battles, North Bend, WA (US); Samuel Gardner Garrett, Seattle, WA (US); Jayson Michael Jochim, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/080,464

(22) Filed: Mar. 24, 2016

Related U.S. Application Data

(60) Provisional application No. 62/289,780, filed on Feb. 1, 2016.

(51) Int. Cl.
| | |
|---|---|
| *B65G 1/137* | (2006.01) |
| *B25J 9/00* | (2006.01) |
| *G06Q 10/08* | (2012.01) |

(52) U.S. Cl.
CPC ............ *B65G 1/137* (2013.01); *B25J 9/0093* (2013.01); *B65G 1/1373* (2013.01); *B65G 1/1376* (2013.01); *G06Q 10/087* (2013.01)

(58) Field of Classification Search
CPC .................................................... B65G 1/1376
See application file for complete search history.

(56) References Cited

U.S. PATENT DOCUMENTS

| | | | | |
|---|---|---|---|---|
| 5,273,392 A | * | 12/1993 | Bernard, II | B65G 1/0485 198/341.04 |
| 6,505,093 B1 | * | 1/2003 | Thatcher | B65G 1/1376 700/214 |
| 6,622,127 B1 | | 9/2003 | Klots et al. | |
| 6,626,632 B2 | * | 9/2003 | Guenzi | B65G 1/1376 414/789.6 |
| 8,215,540 B2 | * | 7/2012 | Szesko | G06F 19/3462 235/375 |
| 8,682,473 B1 | * | 3/2014 | Ramey | G06Q 10/087 700/216 |
| 8,805,573 B2 | | 8/2014 | Brunner et al. | |
| 8,965,560 B2 | * | 2/2015 | Mathi | B65G 1/1378 700/213 |
| 8,983,647 B1 | | 3/2015 | Dwarakanath et al. | |
| 9,008,829 B2 | | 4/2015 | Worsley | |
| 9,315,323 B2 | * | 4/2016 | Schubilske | B65G 1/1376 |
| 9,378,482 B1 | | 6/2016 | Pikler et al. | |
| 9,600,798 B2 | * | 3/2017 | Battles | B65G 1/1373 |
| 2004/0054607 A1 | | 3/2004 | Waddington et al. | |
| 2010/0172724 A1 | * | 7/2010 | Hawkes | B65G 1/0471 414/266 |

(Continued)

*Primary Examiner* — Thomas Randazzo
(74) *Attorney, Agent, or Firm* — Athorus, PLLC

(57) ABSTRACT

Described are systems, methods, and apparatus for automated item sortation and consolidation of items of a consolidation set. The system includes a consolidation station in which a series of automated devices, robotic arms, conveyors, scanners, etc., move and consolidate items of consolidation sets. The automated devices are controlled by an inventory management system that sends instructions to the various devices to coordinate operation of those devices and to coordinate flow of items through the consolidation station.

20 Claims, 10 Drawing Sheets

(56) References Cited

U.S. PATENT DOCUMENTS

| | | |
|---|---|---|
| 2013/0218330 A1 | 8/2013 | Chudy et al. |
| 2014/0214195 A1 | 7/2014 | Worsley |
| 2015/0073589 A1* | 3/2015 | Khodl ................ B25J 5/007 |
| | | 700/218 |
| 2015/0332213 A1 | 11/2015 | Galluzzo et al. |
| 2016/0031644 A1* | 2/2016 | Schubilske ......... B65G 1/1378 |
| | | 700/216 |
| 2016/0176638 A1 | 6/2016 | Toebes |
| 2016/0325934 A1* | 11/2016 | Stiernagle ............. B25J 9/1679 |
| 2017/0121113 A1* | 5/2017 | Wagner ............... B65G 1/1373 |

* cited by examiner

AUTOMATED SHIPMENT SET ITEM CONSOLIDATION

PRIORITY CLAIM

This application claims priority to U.S. provisional patent application No. 62/289,780, filed Feb. 1, 2016, entitled "Automated Shipment Set Item Consolidation," which is incorporated herein by reference in its entirety.

BACKGROUND

Many companies store, package, and ship items and/or groups of items from materials handling facilities. For example, many e-commerce companies and some traditional retail companies house inventory in a materials handling facility and ship items to various destinations (e.g., customers, stores) from the materials handling facility. Receipt of inventory in the materials handling facility, storage of inventory within the materials handling facility, shipping of items from the materials handling facility and the overall flow or movement of items within the materials handling facility (e.g., from receive to storage and/or from storage to shipping) is often labor intensive. In many instances, a single item may be handled by multiple human agents during a particular flow of the item through the facility. Multiple human interactions increase the costs to handle the item, the time to complete a flow of the item through the materials handling facility, and increase the opportunity for mishandling of the item.

BRIEF DESCRIPTION OF THE DRAWINGS

The detailed description is set forth with reference to the accompanying figures. In the figures, the left-most digit(s) of a reference number identifies the figure in which the reference number appears.

Figure 1:
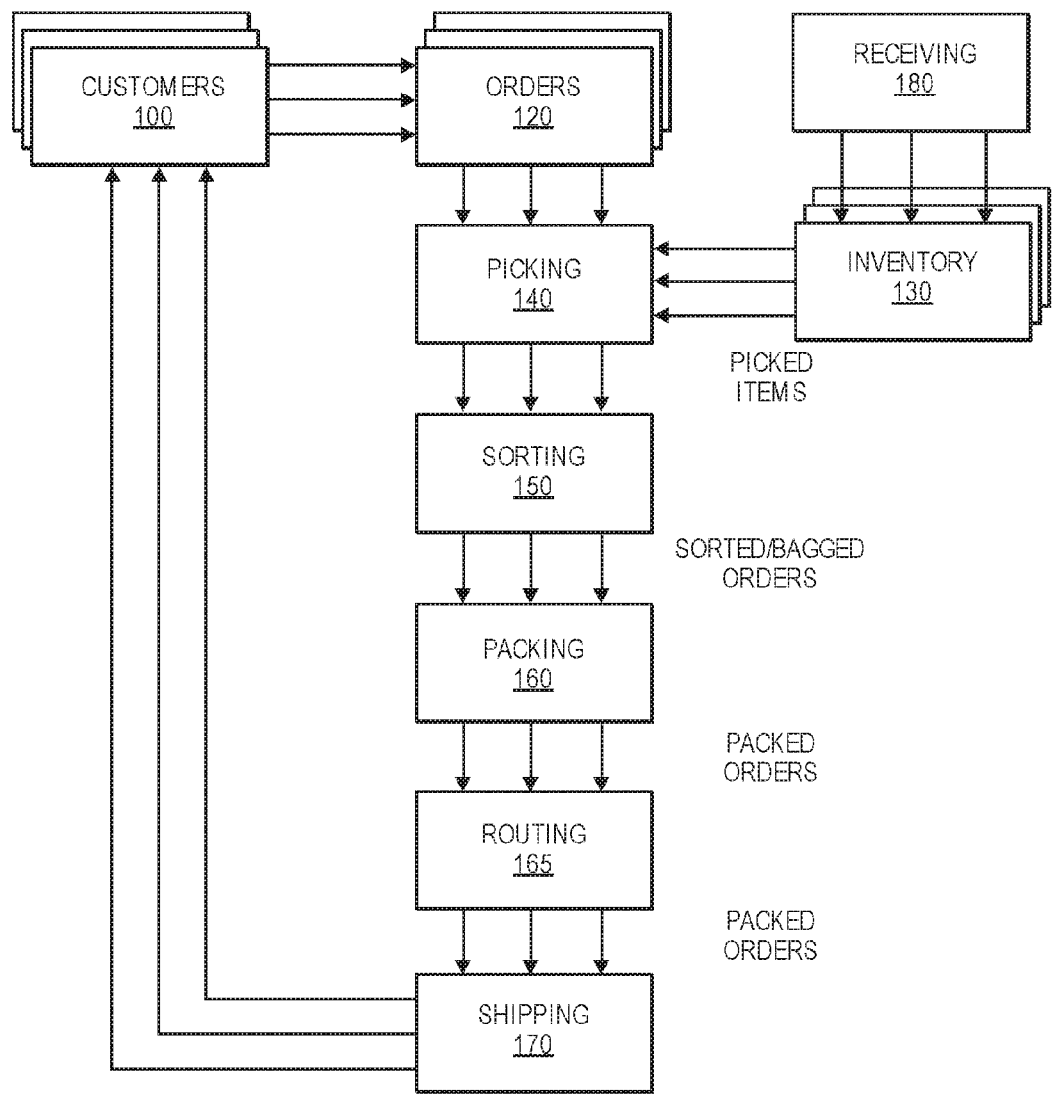
FIG. 1 illustrates a broad view of the operations of a materials handling facility, according to an implementation.

While implementations are described herein by way of example, those skilled in the art will recognize that the implementations are not limited to the examples or drawings described. It should be understood that the drawings and detailed description thereto are not intended to limit implementations to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described are systems, methods, and apparatus for automated item sortation and consolidation for items of a shipment set and/or for items being consolidation for other processing stations. Groups of items to be consolidated are referred to herein as a consolidation set. A consolidation set could be a shipment set or a group of one or more items that are to be consolidated for transfer to another location with the materials handling facility, etc. As discussed below, the system includes an automated consolidation station in which a series of automated devices, robotic arms, conveyors, scanners, etc., move, sort, and consolidate items so that the items can be, for example, packed and shipped to a destination, sent to other processing stations, sent to other materials handling facilities, etc. The automated devices are controlled by an inventory management system that sends instructions to the various devices to coordinate operation of those devices and to coordinate flow of items through the consolidation station.

In one implementation, items arrive at the consolidation station and each item is placed into a different tote, referred to herein as an item tote, such that each item tote contains one item. The item tote with a single item is then placed on an item conveyor at an initial position. Likewise, a consolidation tote that contains or will contain items associated with the item placed in the item tote (e.g., items of the same order, destined for a same process path, location, etc.) is picked by a robotic unit, referred to herein as a buffer robot, and placed on a consolidation conveyor, also at an initial position. As discussed below, the item conveyor and the consolidation conveyor are sequenced together such that an item tote and a corresponding consolidation tote progress along the respective conveyors and each arrive at substantially the same time at respective consolidation positions so that a second robotic unit, referred to herein as a consolidation robot, can transition the item from the item tote to the consolidation tote.

When the item tote and the consolidation tote arrive at the consolidation positions, the consolidation robot executes instructions that cause the consolidation robot to transition the item within the item tote to the consolidation tote (e.g., by picking the item from the item tote or by lifting and tilting the item tote such that gravity causes the item to move from the item tote to the consolidation tote).

In addition to transitioning the item from the item tote to the consolidation tote, a determination is made as to whether the consolidation set is complete (i.e., all items of the consolidation set are positioned within the consolidation tote, the consolidation tote is full). If the consolidation set is complete, instructions are sent that cause the consolidation robot to move the consolidation tote to a completed consolidation conveyor. The completed consolidation conveyor conveys the consolidation tote that contains the consolidated items to packing, shipping, or another location within the materials handling facility for additional processing.

If it is determined that the consolidation set is not complete (e.g., one or more items of the consolidation set are not in the consolidation tote, or the consolidation tote is not full), the consolidation robot receives instructions that cause the consolidation robot to move the consolidation tote to an initial position on a partial consolidation return conveyor. Likewise, instructions are sent to the buffer robot that cause the buffer robot to pick the consolidation tote from the partial consolidation return conveyor and place the consolidation tote at a buffer position on the buffer wall for temporary storage until another item corresponding to the consolidation set arrives at the consolidation station.

The implementations described herein allow items of multiple consolidation sets to arrive at the automated consolidation station in any order and be autonomously processed, sorted, and consolidated into corresponding consolidation sets.

In another implementation, the consolidation station may include a buffer area that stores multiple consolidation totes and a series of conveyors, robotic arms, and/or other autonomous units that convey totes between the buffer area and a put position. For example, as items are in-route to the consolidation station, the inventory management system determines the order in which the items will arrive, the consolidation totes into which those items are to be put, and the sequence in which those consolidation totes are to be placed at the put position. As the first, or current item arrives at the consolidation station, a tote into which that current item is to be put, is transitioned to the put position. A next consolidation tote, corresponding to a next item to arrive (referred to herein as a "next in line" item), is transitioned to a next in line position. Likewise, a consolidation tote corresponding to the following, or second in line item is transitioned to a queue position. For purposes of this discussion we refer to the item that is to be put into the consolidation tote that is at the put position as the "current item," the item that is to be put into the consolidation tote that is at the next in line position, when that tote is transitioned to the put position, as the "next in line item," the item that is to be put into the consolidation tote that is at the queue position, when that tote is eventually transitioned too the put position, as the "second in line item," etc. As items are put to totes and the positioning of the totes updated, the reference to the items is updated such that the next in line item becomes the current item, the second in line item becomes the next in line item, and a third in line item becomes the second in line item.

After the current item is put to the consolidation tote at the put position, the consolidation tote is transitioned away from the put position and routed back to the buffer area, unless it is determined that the consolidation tote is complete (e.g., all items of the shipment set are positioned in the consolidation tote, or that the consolidation tote is full), the consolidation tote is to receive the next in line item, or if it is determined that the consolidation tote is to be used to receive either of the second in line item or the third in line item. If the consolidation tote is to be used to receive the next in line item, the consolidation tote will remain at the put position to receive that item (after the current item is put to the consolidation tote, the next in line item becomes the current item). If the consolidation tote is to be used to receive the second in line item or the third in line item, the consolidation tote is transitioned from the put position back to the next in line position or the queue position.

A "shipment set," as used herein, is one or more items that are to be processed through the materials handling facility and shipped or otherwise transported from the materials handling facility. A shipment set may include all items of an order, less than all items of an order, one or more items that are to be transferred from the materials handling facility to another location (e.g., to another materials handling facility), etc. As discussed above, a shipment set is one example of a consolidation set.

A block diagram of a materials handling facility, which, in one implementation, may be a materials handling facility configured to utilize various systems and methods described herein, is illustrated in FIG. 1. In this example, multiple customers 100 may submit orders 120 to a distributor, such as an e-commerce website, where each order 120 specifies one or more items from inventory 130 to be shipped to the customer or to another entity specified in the order.

A materials handling facility typically includes receiving operations 180 for receiving shipments of stock from various vendors and storing the received stock in inventory 130. To fulfill the orders 120, the one or more items specified in each order may be retrieved or "picked" from inventory 130 (which may also be referred to as stock storage) in the materials handling facility, as indicated by picking operations 140. In some implementations, the items in an order may be divided into multiple shipment sets for fulfillment by a planning service before fulfillment instructions are generated (not shown).

The picking of items from inventory locations may be done using any of a variety of picking techniques. For example, the items may be picked by human picking agents that receive pick lists indicating items to be picked. The items on a pick list may correspond to the same and/or different orders. Alternatively, or in addition thereto, one or more automated techniques, such as mobile drive units, may be used to pick items from inventory locations.

As items are picked, they are routed to a consolidation station for sorting operations 150 and consolidation. Items may arrive at the consolidation station in any order and the consolidation station will sort the items into corresponding consolidation sets, such as a shipment set, as discussed in further detail below. Picked items may be delivered to one or more stations in the materials handling facility for sorting operations 150 into their respective consolidation sets and then transferred to one or more pack stations for packing operations 160 in which the items of a shipment set are packed into containers. The routing operations 165 may sort packed orders to shipping operations 170 for shipping of the packed items to a customer. Alternatively, or in addition thereto, consolidated items may be routed to other processing stations with the materials handling facility, routed to other materials handling facilities, etc.

Note that a picked, packed and shipped shipment set does not necessarily include all of the items ordered by the customer; a shipped shipment set may include only a subset of the ordered items available to ship at one time from one fulfillment facility. Also note that the various operations of a materials handling facility may be located in one building or facility, or alternatively may be spread or subdivided across two or more buildings or facilities.

Note that the arrangement and order of operations illustrated by FIG. 1 is merely one example of many possible implementations of the operations of a materials handling facility. Other types of materials handling, manufacturing, or order fulfillment facilities may include different, fewer, or additional operations and resources, according to different implementations. A materials handling facility may be any type of facility in which items are handled, including, but not limited to, order fulfillment centers, rental centers, retailer centers, distribution centers, packaging facilities, shipping facilities, libraries, museums, warehouse storage facilities, and the like.

The items in a materials handling facility may be of varying shapes, sizes, and/or weight. For example, some items in a materials handling facility may be irregularly shaped. To facilitate automated sorting, the materials handling facility may maintain different sizes of totes into which items may be placed. When an item arrives at the consolidation station, an item tote may be selected based at least in part on the size of the item. Likewise, a consolidation tote may be selected based on the size of all of the items to be consolidated (e.g., the items of the shipment set) into the consolidation tote.

Figure 2:
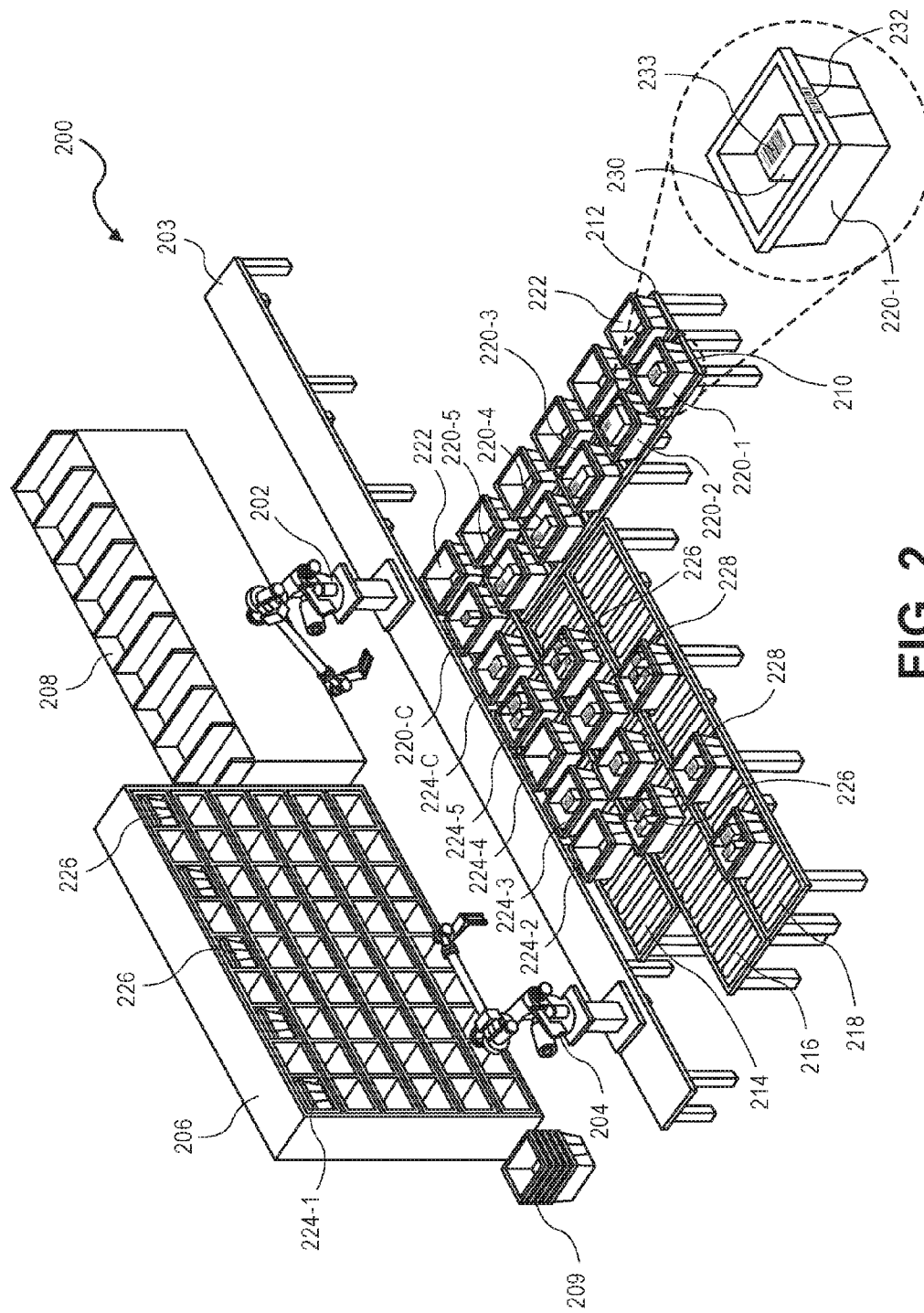
FIG. 2 illustrates a consolidation station, according to an implementation.

FIG. 2 illustrates a consolidation station 200, according to an implementation. The consolidation station 200 includes a series of conveyors, such as belt conveyors, that are used to move totes to different areas within the consolidation station 200. In this example, the consolidation station 200 includes an item conveyor 210, an empty tote return conveyor 212, a consolidation conveyor 214, a partial consolidation return conveyor 216, and a completed consolidation conveyor 218. In some implementations, the station 200 may not include a completed consolidation conveyor, and, as discussed further below, consolidation totes containing completed consolidation sets may be placed onto a chute 208 for additional processing, such as packing.

The consolidation station 200 also includes a consolidation robot 202 and a buffer robot 204. The robots 202, 204 may be six-way positionable robotic arms that are configured with hooks, clamps, and/or other forms of lifts that can engage and lift items from totes and/or engage and lift the totes as the totes move along the conveyors. Likewise, the robots 202, 204 may be horizontally adjustable along a rail 203 so that the robots 202, 204 can move between different positions along the conveyors, buffer wall 206, and chutes 208. The robots 202, 204 and conveyors 210, 212, 214, 216, and 218 communicate with and receive instructions from the inventory management system.

The buffer wall 206 is accessible by the buffer robot 204 and is configured to temporarily store or buffer consolidation totes that contain some but not all of the items of a consolidation set. The buffer wall 206 may be of any size and shape and include any number, size and configuration of buffer slots into which consolidation totes 226 may be stored. In some examples, the slots may vary in size depending on the available sizes of the totes. Likewise, any number, size, and/or shape of chutes 208 may be utilized. As discussed below, the chutes 208 are accessible by the consolidation robot and are configured to temporarily store one or more consolidation totes and/or items of a consolidation set.

The consolidation station 200 consolidates items into consolidation totes 224. When a consolidation tote 224 includes all items of a consolidation set, referred to herein as a completed consolidation set or a completed consolidation tote, the completed consolidation tote 228 is transitioned from the consolidation station 200 to another station, such as packing, for addition processing. Likewise, for consolidations other than shipment set consolidations, when the consolidation tote is full and/or exceeds a specified weight, the consolidation tote 228 or the consolidation set is considered complete and transitioned from the consolidation station 200 to another station or other process.

If the consolidation tote is not complete (e.g., it does not include all of the items of the shipment set, or it is not full), the buffer robot 204 returns the consolidation tote to a buffer slot within the buffer wall 206.

A consolidation tote, such as consolidation tote 224-1, which is currently stored within the buffer wall, includes some but not all items of a consolidation set. In this example, consolidation tote 224-1 is used to consolidate items of a shipment set, referred to in this example as shipment set 1. Consolidation tote 224-2 is empty but has been associated with another shipment set, referred to in this example as shipment set 2. Consolidation tote 224-3 includes some but not all items for another shipment set, referred to in this example as shipment set 3. Consolidation tote 224-4 is empty but has been associated with a shipment set, referred to in this example as shipment set 4. Consolidation tote 224-5 includes some but not all items for another shipment set, referred to in this example as shipment set 5. Finally, consolidation tote 224-C includes some but not all items for another shipment set, referred to in this example as shipment set 6.

When an item for a consolidation set arrives at the consolidation station 200, the item is placed into an item tote 220 and put at an initial position on the item conveyor 210. In this example, an item 230 is placed in the item tote 220-1 which is placed on the item conveyor 210 at the initial position. As the item conveyor 210 moves forward, the item totes 220 progress toward a consolidation location, which is adjacent the consolidation robot. The item conveyor 210 may include any number of positions and, as the conveyor moves, the totes progress from the initial position toward a consolidation position. In this example, there are six positions. The item tote 220-1, which includes an item associated with shipment set 1, is at the initial position, item tote 220-2, which includes an item associated with shipment set 2, is at the second position, item tote 220-3, which includes an item associated with shipment set 3, is at the third position, item tote 220-4, which includes an item associated with shipment set 4, is at the fourth position, item tote 220-5, which includes an item associated with shipment set 5, is at the fifth position, and item tote 220-C, which includes an item associated with shipment set 6, is at the consolidation position. In other examples, the item conveyor may have additional or fewer positions.

In a similar manner, the consolidation conveyor 214 has a corresponding number of positions and consolidation totes that are associated with a consolidation set are placed in respective positions along the consolidation conveyor 214. Specifically, when an item arrives at the consolidation station 200, the item is identified and the consolidation set to which the item is associated is determined. For example, the item 230 may be identified by scanning an identifier 233 (e.g., barcode, bokode, or quick-response ("QR") code), detecting a radio frequency identification ("RFID") tag, and the like. The identifier 233 may be used by the inventory management system to determine a consolidation set associated with the item 230. Based on the identified consolidation set, a consolidation tote 224 that is associated with the consolidation set is determined.

For example, if some items for the consolidation set have previously arrived at the consolidation station 200 and have been sorted into a consolidation tote 224, a consolidation tote is already associated with the consolidation set. If the item 230 is the first item (or only item) of the consolidation set, no consolidation tote may be associated with the consolidation set. In such an example, an empty tote may be picked by the buffer robot 204 from the empty tote stack 209 and associated with the consolidation set. For example, the consolidation tote may include an identifier (e.g., barcode that is scanned and associated by the inventory management system with the consolidation set. In other implementations, because the position of the consolidation tote is known at all times within the consolidation station 200, the position of the tote may be utilized to maintain an association between the consolidation tote and the consolidation set.

Returning to the above example, when an item for a consolidation set arrives at the consolidation station 200, the item 230 is identified and placed in an item tote at an initial position on the item conveyor 210, and the consolidation tote 224 associated with that consolidation set is also placed at an initial position on the consolidation conveyor 214. In this example, the consolidation tote 224-1 is determined to be associated with the consolidation set corresponding to item 230. Based on such determination, instructions are sent that cause the buffer robot 204 to pick the consolidation tote 224-1 from the buffer wall 206 and place the consolidation tote 224-1 at an initial position on the consolidation conveyor. As illustrated, the consolidation conveyor 214 has the same number of positions as the item conveyor 212. Accordingly, the item tote at the initial position on the item conveyor 212 will contain an item that corresponds to a consolidation set that is associated with the consolidation tote at the initial position on the consolidation conveyor 214.

When an item tote 220 and a correspondingly sequenced consolidation tote 224 arrive at respective consolidation positions, the consolidation robot 202 executes instructions that cause the consolidation robot to transition the item 230-C from the item tote 220-C to the consolidation tote 224-C. For example, the inventory management system may send instructions to the consolidation robot 202 that cause the consolidation robot to pick the item 230-C from the item tote 220-C and place the item 230-C in the corresponding consolidation tote 224-C. Alternatively, the consolidation robot 202 may be instructed to engage the item tote 220-C, lift and tilt the item tote 220-C so the item 230-C falls from the item tote 220-C into the consolidation tote 224-C.

After the item 230-C is transitioned from the item tote 220-C to the consolidation tote 224-C, the item tote 220-C, which is now an empty tote 222, is moved by the consolidation robot 202 to the empty tote return conveyor 212. The empty tote return conveyor 212 moves in the opposite direction of the item conveyor 210 so that the empty totes 222 move away from the consolidation robot 202 and can again be used to contain an item that has arrived at the consolidation station 200.

In addition to moving the tote to the empty item tote return conveyor 212, a determination is made as to whether all items of the consolidation set are located in the consolidation tote 224-C or if the consolidation tote 224-C is full. For example, the inventory management system may maintain a list or indication of the items that have been placed in each consolidation tote 224 and determine if all items of the consolidation set have been placed in the consolidation tote 224-C. If it is determined that all items of the consolidation set have not yet been placed in the consolidation tote 224-C, instructions are sent to the consolidation robot 202 to move the consolidation tote 224-C to an initial position on the partial consolidation tote return conveyor 216.

The partial consolidation return conveyor 216 moves in a direction opposite the consolidation conveyor 214 so that totes placed in the partial consolidation return conveyor 216 are conveyed away from the consolidation location. Like the item conveyor 210 and the consolidation conveyor 214, the partial consolidation return conveyor 216 has a series of stations or positions, such as an initial position, at which a partial consolidation tote is placed by the consolidation robot. As the partial consolidation return conveyor moves, the totes 226 move from position to position and position information for each tote 226 may be updated and maintained by the inventory management system.

Returning to the example, if it is determined that the consolidation tote 224-C includes all the items of the consolidation set, or the consolidation tote 224-C is full, the consolidation robot 202 receives instructions to move the consolidation tote 224-C to an initial position on the completed consolidation conveyor 218. The completed consolidation conveyor 218, like the partial consolidation return conveyor 216 moves in a direction opposite that of the consolidation conveyor 214 so that totes 228 placed on the completed consolidation conveyor are conveyed away from the consolidation robot 202. Likewise, the completed consolidation conveyor 218 may convey the totes away from the consolidation station 200 to other operations, such as packing, shipping, etc.

The buffer robot 204, in addition to picking consolidation totes from the buffer wall 206 and placing the consolidation totes onto the consolidation conveyor 214, also picks partial consolidation totes 226 from the partial consolidation return conveyor 216 and places those partial consolidation totes 226 into slots on the buffer wall 206. In some implementations, the partial consolidation totes may be randomly placed into any open slot on the buffer wall 206. For example, the inventory management system may randomly select an open slot on the buffer wall, associate that slot with a partial consolidation tote 226 that is positioned on the partial consolidation return conveyor 216 and instruct the buffer robot 204 to pick the partial consolidation tote 226 from a particular position on the partial consolidation return conveyor 216 and place the picked tote into the determined slot on the buffer wall 206. As noted above, because the position of the consolidation tote is maintained, the position information may be used to maintain an association between the consolidation tote and the consolidation set associated with the items located in the tote.

While the above example describes the buffer robot picking partial consolidation totes 226 from the buffer wall and the consolidation robot 202 transitioning items from an item tote 220-C into a consolidation tote 224-C located on the consolidation conveyor 214, in some implementations an item located in an item tote on the item conveyor 210 may be associated with a consolidation tote positioned on a chute 208 or the consolidation set for an item may be associated with a chute 208 rather than a consolidation tote. In such examples, the corresponding position on the consolidation conveyor 214 would remain empty and when the item tote 220 arrives at the consolidation position, the consolidation robot 202 is instructed to transition the item from the item tote 220 to the consolidation tote located in one of the chutes 208 or to transition the item from the item tote 220 to the associated chute 208.

For example, if a shipment set is for a single item, the shipment set may be associated with a chute 208 so that the item is picked from the item tote and placed directly to the chute 208. When the item is placed to the chute 208, the item may be transitioned away from the consolidation station 200 and to another operation, such as packing or shipping. Such a process may also be used for consolidation sets that include multiple items. For example, as each item of a multi-item shipment set arrives at the consolidation station 200, the item is placed in an item tote at an initial position on the item conveyor 210. The corresponding initial position on the consolidation conveyor 214 is left empty and when the item tote arrives at the consolidation position, the item is transitioned from the item tote to the associated chute 208. This process is done for each item of the shipment set and when all items of the shipment set have been placed in the chute 208, the completed shipment set may be transitioned from the chute 208 for other operations, such as packing and shipping.

Because position information is maintained for each consolidation tote and each item tote and the consolidation totes and item totes are sequenced on the respective conveyors, items and consolidation sets may be consolidated into consolidation totes without requiring re-identification of each item and/or each tote as it progresses within the consolidation station 200. Once an item arrives at the consolidation station 200 and is identified, position information for that item is maintained by the inventory management system while the item is within the consolidation station 200. Such tracking simplifies the processing required to sort and consolidate multiple items with multiple consolidation sets. Likewise, because the position of a consolidation tote is known, when a new item arrives at the consolidation station 200 that corresponds to that consolidation set, the consolidation tote may be picked from any location (e.g., a slot on the buffer wall, or a position on the partial consolidation return conveyor 216) and placed at an initial position on the consolidation conveyor 214 so that the consolidation tote and corresponding item tote are sequenced and arrive at the consolidation positions together for consolidation of the item into the consolidation tote.

While the above example describes the use of the consolidation station for shipment sets, it will be appreciated that any form of item consolidation may performed, with shipment set consolidation and/or separately. For example, some items may be routed to the consolidation station for consolidation so that the items can be sent to another processing station or to another materials handling facility. In such an instance, rather than there being a defined quantity of items to be placed in the consolidation tote, the consolidation tote may be designated for items of that type and used until the tote is full and/or has exceeded a defined weight. The same process for consolidating items into the consolidation tote is utilized. If the tote is not full, it is routed back to the buffer wall on the partial consolidation return conveyor. If the consolidation tote is full, the consolidation set is considered complete, and the consolidation tote is routed along the completed consolidation set conveyor to other processing.

Figure 3:
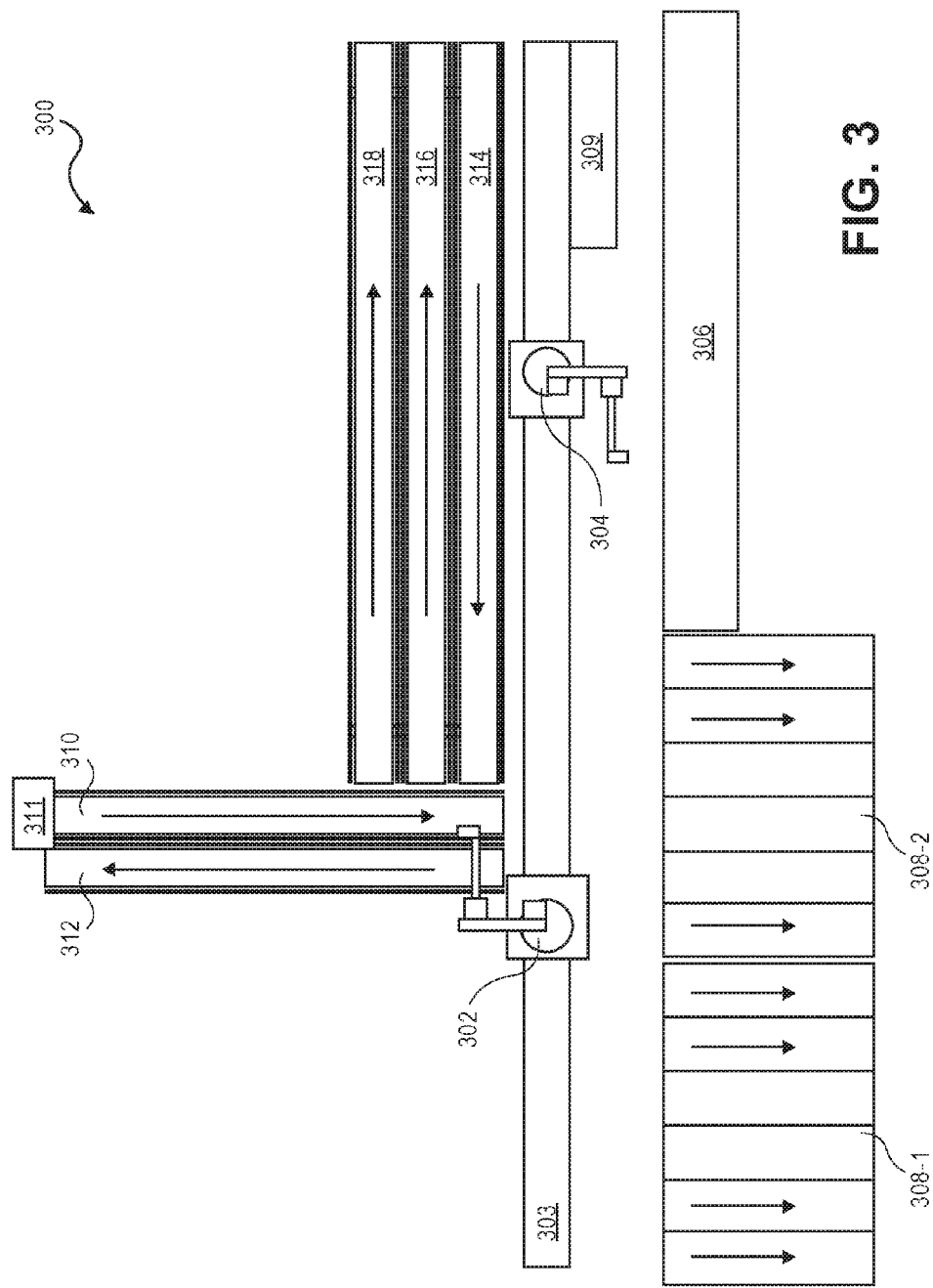
FIG. 3 illustrates a top-down view of a consolidation station, according to an implementation.

FIG. 3 illustrates a top-down view of a consolidation station 300, according to an implementation. The consolidation station 300 corresponds to the consolidation station 200 of FIG. 2. To aid in explanation, the totes have been removed from the positions on the conveyors. As illustrated, the consolidation station 300 includes an item conveyor 310 and an empty tote return conveyor 312. These two conveyors 310, 312 form a closed loop so that there is a continuous supply of empty totes at the induction point of the item conveyor 310 for use in holding an item that is being inducted into the consolidation station 300. When an item arrives at the consolidation station 300 it is identified at an induction position 311. For example, the induction position 311 may include a scanner, or other form of identification that determines the item.

In other implementations, the empty tote return conveyor may be eliminated and the items, once identified, may be placed directly onto the conveyor 310 at the initial position. Regardless of whether the items are placed into item totes or directly onto the item conveyor, the position of each item and/or item tote is maintained by the inventory management system as it progresses along the item conveyor 310. For example, the item conveyor 310 may be segmented into multiple positions (e.g., six positions) and as items are processed at the consolidation position by the consolidation robot 302, remaining items on the conveyor move from position to position until they have reached the consolidation position and are likewise processed by the consolidation robot 302. To move an item or an item tote between positions, the conveyor is moved a defined amount such that the item is moved from one position to another position.

The consolidation station 300 also includes a consolidation conveyor 314, a partial consolidation return conveyor 316, and a completed consolidation conveyor 318. Similar to the item conveyor 310, the consolidation conveyor includes a series of positions at which consolidation totes may be positioned. Each time the conveyor is moved a defined amount, a consolidation tote moves between positions until it reaches a consolidation position adjacent the consolidation robot 302. The consolidation conveyor 314 includes the same number of positions as the item conveyor 310 so that items or item totes can be placed at the same position as consolidation totes associated with the same items to be consolidated. By placing items on the item conveyor at a same position as corresponding consolidation totes on the consolidation conveyor, the item and the corresponding consolidation tote arrive at the consolidation positions adjacent the consolidation robot 302 at approximately the same time.

In some implementations the consolidation conveyor 314 and the item conveyor 310 may not have the same number of positions. For example, the item conveyor 310 may include six positions and the consolidation conveyor 314 may include three positions. In such an implementation, the inventory management system may maintain position information for items placed at positions on the item conveyor 310. When the item reaches the third position on the item conveyor, the inventory management system sends instructions to the buffer robot to pick a consolidation tote corresponding to the order for the item, and to place that consolidation tote at the initial position on the consolidation conveyor 314. By placing the consolidation tote at the initial position on the consolidation conveyor when an item that is to be transitioned into that consolidation tote is at the third position on the item conveyor, both the consolidation tote and the item will arrive at the consolidation positions at approximately the same time. In other implementations, the conveyors may have still other sets or numbers of positions and the inventory management system may maintain position information for each item and/or tote so that the item and tote associated with a same order both arrive at the consolidation positions for consolidation.

When an item or item tote arrives at the consolidation position and the corresponding consolidation tote arrives at the consolidation position, the consolidation robot 302 transfers the item positioned at the consolidation position of the item conveyor 310 into the consolidation tote that is positioned at the consolidation position. Likewise, the consolidation robot 302 is utilized to move the item tote that is empty to the item tote return conveyor 312 and to move the consolidation tote that is positioned at the consolidation position to the partial consolidation return conveyor 316, the completed consolidation conveyor 318, and/or to place the consolidation tote into a chute 308-1, 308-2.

The buffer robot 304 is used to pick and place consolidation totes from and to the buffer wall 306. Likewise, the buffer robot 304 is used to place consolidation totes into position on the consolidation conveyor 314 and to pick partial consolidation totes from the partial consolidation return conveyor 316. As discussed above, the consolidation robot 302 and the buffer robot 304 may be six-way robotic arms. Likewise, the robots 302, 304 may move horizontally along one or more rails 303. If a shipment set does not yet have an associated consolidation tote, the buffer robot 304 may pick an empty tote from the empty tote stack 309 and the picked empty tote will be associated with the shipment set as the consolidation tote.

In some implementations, the consolidation robot 302 and the buffer robot 304 may utilize the same rail for horizontal movement. In such an implementation, the consolidation robot 302 may be confined to operation in the area adjacent the consolidation positions and the chutes. Likewise, the buffer robot may be confined to operation in the area adjacent the consolidation conveyor and the buffer wall. In other implementations, the consolidation robot 302 and the buffer robot may each utilize a separate rail for horizontal movement and each rail may span the length of the consolidation station 300. In such a configuration, the buffer robot 304 and/or the consolidation robot 302 may perform any of the operations discussed herein depending on the position of each robot on the rails.

Figure 4:
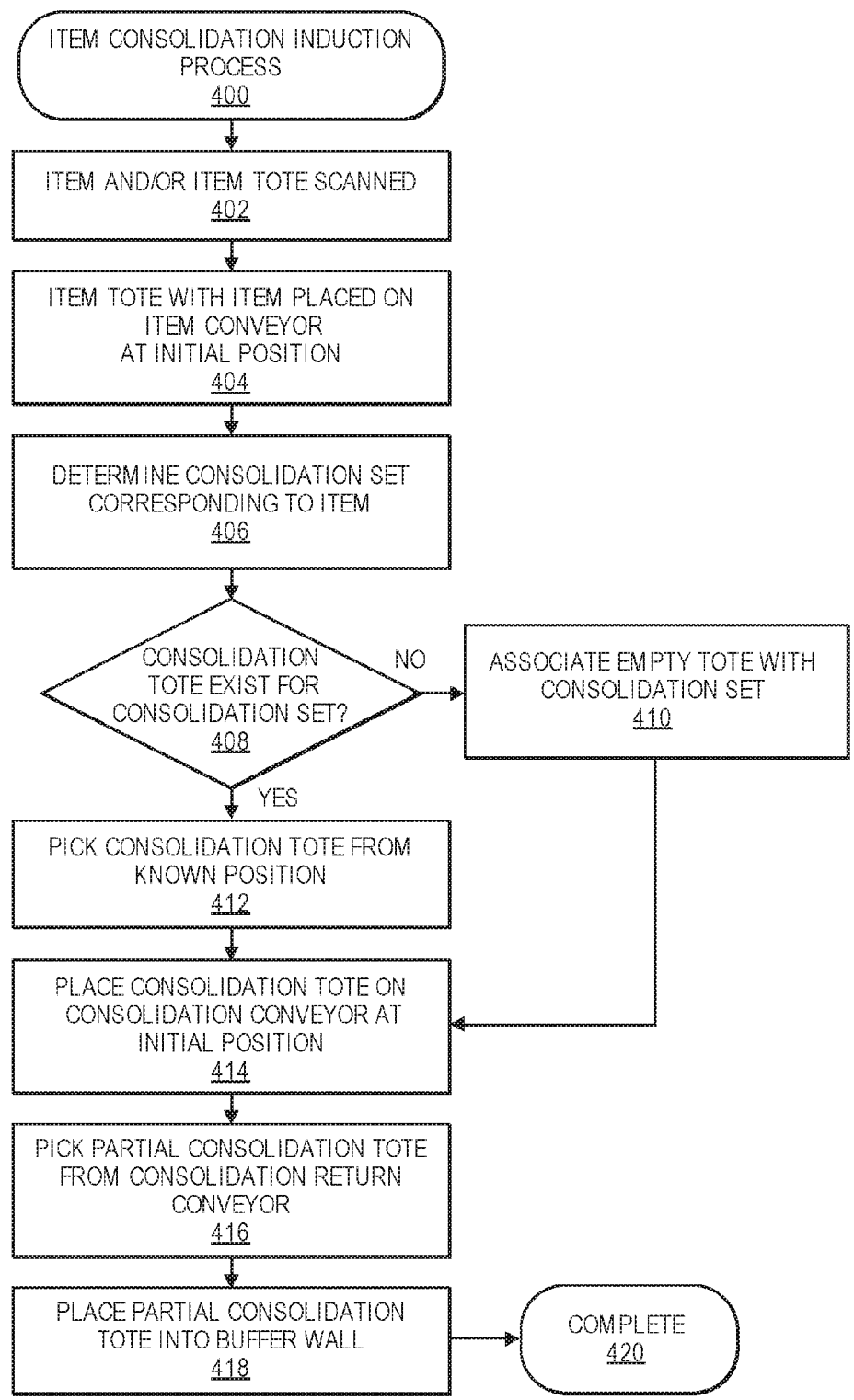
FIG. 4 is a flow diagram illustrating an example item consolidation induction process, according to an implementation.

FIG. 4 is a flow diagram illustrating an example item consolidation induction process 400, according to an implementation. The process is illustrated as a collection of blocks in a logical flow graph. Some of the blocks represent operations that can be implemented in hardware, software, or a combination thereof. In the context of software, the blocks represent computer-executable instructions stored on one or more computer-readable media that, when executed by one or more processors, perform the recited operations. Generally, computer-executable instructions include routines, programs, objects, components, data structures and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations, the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded or uploaded through the Internet or other networks. Finally, the order in which the operations are described is not intended to be construed as a limitation, and any number of the described operations can be combined in any order and/or in parallel to implement the process. Likewise, additional or fewer operations than those described may be utilized with the various implementations described herein.

The example process 400 may be performed with respect to the buffer robot of a consolidation station and may include an inventory management system generating instructions that cause the buffer robot to perform specific actions. The example process 400 begins when an item or item tote is scanned at an induction position of a consolidation station, as in 402. As discussed above, when an item arrives at a consolidation station it is identified by, for example scanning a barcode, QR code, or other visual identifier associated with the item. Alternatively, or in addition thereto, if the item is already associated with a tote, the tote may be scanned to identify the item. In other implementations, other techniques may be used to identify the item.

As the item is identified, the item is placed in an item tote, if not already positioned within an item tote, and the item tote is placed at an initial position on the item conveyor, as in 404. As discussed above, the initial position on the item conveyor is the initial position of a plurality of positions along the item conveyor. Likewise, the consolidation conveyor includes a same number of positions such that items at an initial position on the item conveyor and a consolidation tote at an initial position on the consolidation conveyor are sequenced and each correspond to a same consolidation set.

Returning to FIG. 4, in addition to placing the item tote at the initial position on the item conveyor, the consolidation set associated with the identified item is determined, as in 406. For example, the inventory management system may maintain a data store that includes an association of each consolidation set and corresponding items that are associated with the consolidation set.

A determination is then made as to whether a consolidation tote is already established and maintained in the consolidation station for the determined consolidation set, as in 408. For example, if another item associated with the consolidation set has already been processed at the consolidation station, a consolidation tote that contains the already processed item will be maintained at the consolidation station. Alternatively, rather than associating a consolidation set and items of the consolidation set with a consolidation tote, the consolidation set and corresponding items may be associated with a chute, as discussed above.

If it is determined that a consolidation tote does not already exist for the consolidation set, an empty tote is associated with the consolidation set and instructions are sent to pick an empty tote from the empty tote stack, as in 410. In such an instance, the empty tote that is associated with the consolidation set becomes the consolidation tote for that consolidation set.

If it is determined that a consolidation tote for the determined consolidation set does already exist, instructions are sent that cause the consolidation tote to be picked from a known position, as in 412. The known position may be from a position within the buffer wall or from a position on the partial consolidation return conveyor. The known position may be stored as information in a data store maintained by the inventory management system.

Upon picking of a consolidation tote from a known position or after associating an empty tote with the consolidation set, instructions are sent that cause the consolidation tote to be placed on the consolidation conveyor at the initial position such that it corresponds with and is sequenced with the position of the item determined at block 404 that is on the item conveyor, as in 414. As discussed above, the item conveyor and the consolidation conveyor each include a same number of positions such that totes at the corresponding positions arrive at the consolidation positions and the consolidation robot at the same time.

In addition to sending instructions that cause the consolidation tote to be placed at the initial position on the consolidation conveyor, instructions may be sent that cause a partial consolidation tote to be picked from the partial consolidation return conveyor, as in 416. This may be done following a placement of a consolidation tote on the consolidation conveyor so that movement of the buffer robot is efficient. For example, the consolidation conveyor and the partial consolidation return conveyor may be positioned adjacent one another, as illustrated in FIG. 3. When the buffer robot extends to place a consolidation tote onto the consolidation conveyor it may extend further, after placement, to pick a partial consolidation tote from the partial consolidation return conveyor.

In addition to sending instructions that cause picking of a partial consolidation tote from a position on the partial consolidation return conveyor, instructions may be sent that cause placement of the picked partial consolidation tote into an open slot on the buffer wall, as in 418. As discussed above, stow into the buffer wall may be random and the selected position associated in a data store with the consolidation tote so that the position of the tote remains known. When another item corresponding to the consolidation set arrives and is inducted into the consolidation station, instructions are sent that cause the corresponding consolidation tote to be picked from the position on the buffer wall.

The example process 400 then completes, as in 420.

Figure 5:
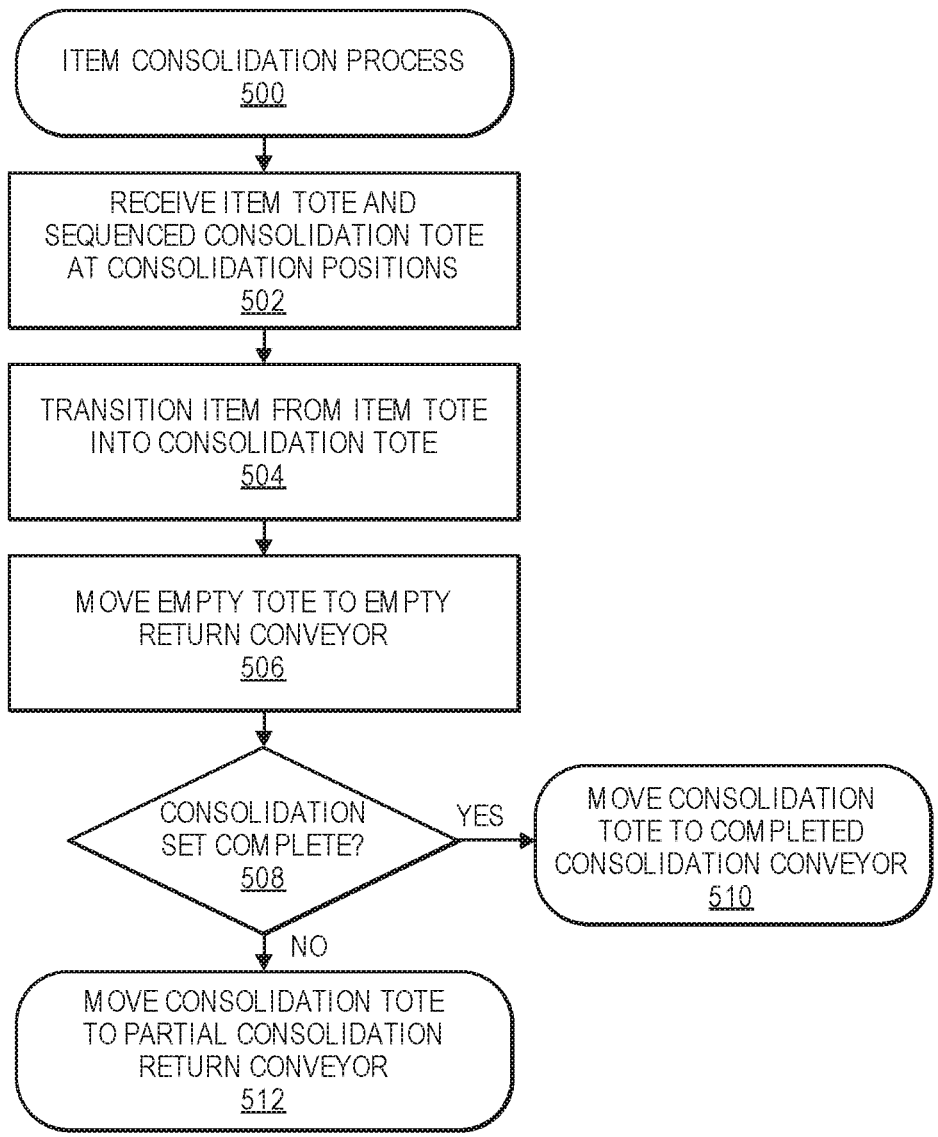
FIG. 5 is a flow diagram illustrating an example item consolidation process, according to an implementation.

FIG. 5 is a flow diagram illustrating an example item consolidation process 500, according to an implementation. The example process may be performed with respect to the consolidation robot of a consolidation station and may include an inventory management system generating instructions that cause the consolidation robot to perform specific actions.

The example process 500 begins when an item tote and a sequenced consolidation tote are received at the consolidation positions on the item conveyor and the consolidation conveyor, respectively, as in 502. As discussed above, each time the conveyors move, the totes or items positioned on those conveyors advance positions, with a new set of totes/items arriving at the consolidation positions each time.

While this example describes a consolidation tote arriving at a consolidation position on the consolidation conveyor and an item tote arriving at a consolidation position on the item conveyor, in some implementations, only an item tote may arrive at a consolidation position on the item conveyor and the consolidation position on the consolidation conveyor may be empty. In such an example, the item may be associated with a chute or tote that is accessible by the consolidation robot. In another example, the item may be placed directly on the item conveyor such that no item tote is utilized.

Upon receiving the item tote and corresponding consolidation tote, instructions are executed that cause transition of the item from the item tote into the consolidation tote, as in 504. For example, the inventory management system may instruct the consolidation robot to pick the item from the item tote (or from off the item conveyor) and place the item into the consolidation tote. Alternatively, the instructions may cause the consolidation robot to pick the item tote, position the item tote over the consolidation tote, and rotate the item tote such that the item falls from the item tote into the consolidation tote.

Instructions are also sent that cause the item tote from which the item has been removed, referred to now as an empty tote, to be moved from the item conveyor to the empty tote return conveyor, as in 506. This movement of the empty tote may be part of the movement of the item tote that occurs when the tote is picked from the item conveyor and the item emptied from the tote. For example, once the item is emptied from the tote, the instructions may cause the consolidation robot to rotate and move the empty tote to a position above the empty tote return conveyor and place the empty tote on the empty tote return conveyor.

A determination is also made as to whether the consolidation set corresponding to the consolidation tote is complete, as in 508. A consolidation set may be considered complete when, for example, all items corresponding to a shipment set are positioned within the consolidation tote, or when the consolidation tote is full and/or exceeds a defined weight. If it is determined that the shipment set is complete, instructions are sent that cause the consolidation tote to be moved from the consolidation position on the consolidation conveyor to a position on the completed consolidation conveyor, as in 510. These instructions may include causing the consolidation robot to pick the consolidation tote from the consolidation position and place the consolidation tote at a position on the completed consolidation conveyor. While this example describes the instructions being sent to the consolidation robot, in other implementations, the instructions to move the consolidation tote from the consolidation position on the consolidation conveyor to a position on the completed consolidation conveyor may be sent to the buffer robot and the buffer robot may move the consolidation tote from the consolidation conveyor to the completed consolidation conveyor.

If it is determined that the consolidation set is not complete, instructions are sent that cause movement of the consolidation tote from the consolidation position on the consolidation conveyor to an initial position on the partial consolidation return conveyor, as in 512. These instructions may include instructions that cause the consolidation robot to pick the consolidation tote from the consolidation position and place the consolidation tote at the initial position on the partial consolidation return conveyor. While this example describes the instructions being sent to the consolidation robot, in other implementations, the instructions to move the consolidation tote from the consolidation position on the consolidation conveyor to an initial position on the partial consolidation return conveyor may be sent to the buffer robot and the buffer robot may move the consolidation tote from the consolidation conveyor to the partial consolidation return conveyor.

After the item tote has been emptied and moved to the empty tote return conveyor and the consolidation tote moved from the consolidation position on the consolidation conveyor, instructions are sent that cause the item conveyor and the consolidation conveyor to activate such that the other totes positioned on those conveyors advance a position. For example, when the item conveyor moves, the item tote in the initial position advances to a position adjacent the initial position. Likewise, a tote adjacent to the consolidation position on the item conveyor advances to the consolidation position. In a similar manner, when the consolidation conveyor moves, the consolidation tote in the initial position advances to a position adjacent the initial position. Likewise, a consolidation tote adjacent to the consolidation position on the consolidation conveyor advances to the consolidation position.

Instructions may also be sent to the partial consolidation return conveyor to move and advance the partial consolidation totes positioned on the partial consolidation conveyor a position. In some implementations, the completed consolidation tote may also move in response to instructions. In other implementations, the completed consolidation conveyor may be continuously moving and when a completed consolidation tote is placed on the completed consolidation conveyor, the tote is conveyed away from the consolidation station.

Figure 6:
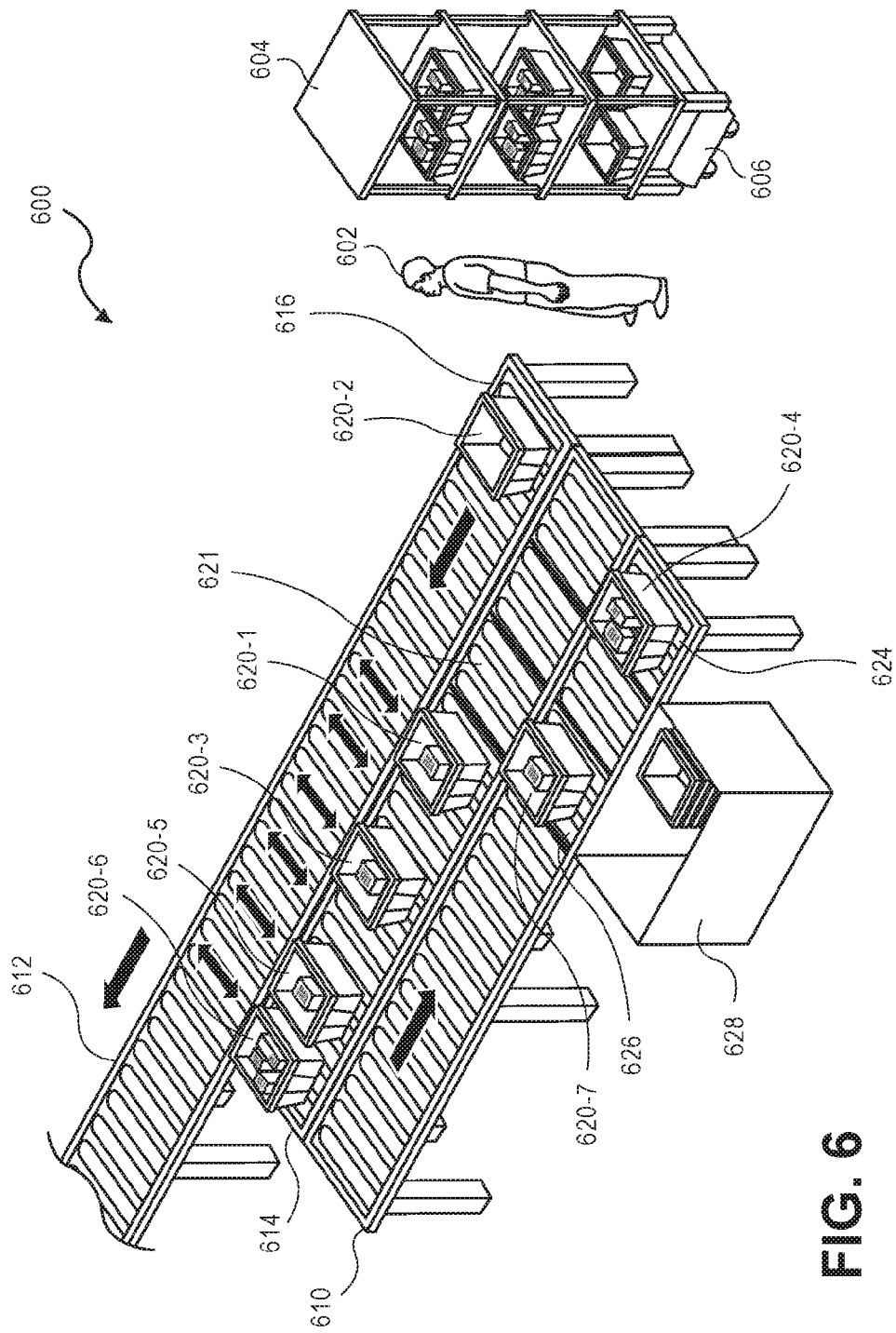
FIG. 6 is a view of an item consolidation station, according to an implementation.

FIG. 6 illustrates another consolidation station 600, according to an implementation. The consolidation station 600 includes a series of conveyors, such as belt conveyors, that are used to move totes to different areas within the consolidation station 600. In this example, the consolidation station 600 includes an infeed conveyor 610, and a buffer return conveyor 612. Rather than a buffer wall, in this example, the consolidation station also includes a buffer area 614 at which one or more consolidation totes are temporarily stored. In this example, there are six buffer positions within the buffer area. Two of the buffer positions are empty and four are currently filled with consolidation totes 620-1, 620-3, 620-5, and 620-6. It will be appreciated that there can be any number and/or configuration of buffer positions within a consolidation station. The infeed conveyor 610 and/or buffer return conveyor 612 may include one or more divert mechanisms, such as a right angle transfer, that transition totes between the conveyor and another position. For example, as illustrated by the bidirectional arrows, the buffer return conveyor may include six right angle transfers that are operable to transition a consolidation tote from the buffer return conveyor 610 to a buffer position within the buffer area 614. The divert mechanisms may be unidirectional or bidirectional. For example, a divert mechanism may likewise be used to transition a consolidation tote from a buffer position within the buffer area 614 to the buffer return conveyor 612.

Likewise, the consolidation station includes a put position 616 where consolidation totes are positioned so that an agent 602 can put a current item to the consolidation tote that is at the put position. For example, a mobile drive unit 606 may deliver an inventory holder 604 to a receiving position of the consolidation station so that the agent 602 can pick one or more items from that inventory holder. Rather than requiring the agent to determine an appropriate consolidation tote into which the picked item is to be put, the appropriate consolidation tote is delivered to the put position 616. In this manner, an agent can always put to the same location, regardless of the item destination or the consolidation set with which the item is associated.

The consolidation station 600 also includes a next in line position 624, a queue position 626, a re-circulation position 621, and a tote destacker 628. As discussed in the following example, the next in line position is a position within the consolidation station where the next consolidation tote or next in line tote to be delivered to the put position is staged until it is moved to the put position. Likewise, the queue position is a position within the consolidation station 600 where the second-in-line tote to be delivered to the put position 616 is to be staged until it is moved to the next in line position 624 and then to the put position. The tote destacker 628 may be an area where totes are manually destacked. Alternatively, the destacker 628 may include a robotic unit that is configured to autonomously destack empty totes.

In the illustrated example, there are seven consolidation totes that may be transitioned around the consolidation station so that the agent 602 can place an item into the appropriate tote at the put position when the item arrives at the consolidation station 600. As will be appreciated, any number and combination of consolidation totes and/or buffer stations 614 may be utilized with the implementations described herein and the use of seven consolidation totes and six buffer positions 614 is provided only as an example. For example, the number of consolidation totes may be same as the number of buffer positions. As another example, the number of consolidation totes may be the same as the number of buffer positions, the next in line position, and queue position.

In this example, a mobile drive unit 606 has delivered an inventory holder 604 that includes a current item to be placed in tote 620-2. The inventory management system has already sent instructions that caused consolidation tote 620-2 to be positioned at the put position 616 so that the agent 602 can pick the current item from the inventory holder 604 and put the current item to tote 620-2. In addition, the inventory management system has received an indication of the next two items scheduled to arrive at the consolidation station 600 and sent instructions that caused the consolidation totes into which those items are to be put to be transitioned to the next in line position 624 and the queue position 626.

When the agent 602 puts the current item to the consolidation tote 620-2, the inventory management system receives an indication of the item put. For example, the agent 602 may scan the tote and/or the item as the item is put to the tote. The scan by the agent may result in a notification signal being sent to the inventory management system indicating that the current item has been put to the tote 620-2. As another example, the agent may press a button or other mechanism to generate a signal indicating that the current item has been put to the tote.

Upon receiving an indication that the current item has been put into the consolidation tote 620-2 at the put position 616, instructions are sent that cause the consolidation tote 620-2 to be transitioned from the put position 616 to the buffer return conveyor 612. For example, the put position may include a conveyor or rollers that are activated that cause the consolidation tote 620-2 to transition from the put position 616 to the buffer return conveyor. In other implementations, if the next in line item, which following a confirmation that the current item has been put into the consolidation tote becomes the current item, is also to be put to the same tote, the consolidation tote 620-2 may remain at the put position 616 until the now current item is also put into the consolidation tote 620-2.

In addition to causing the consolidation tote 620-2 to transition from the put position 616, instructions are sent that cause the consolidation tote 620-4 at the next in line position 624 to transition from the next in line position 624 to the put position 616 so that when the next in line item arrives at the consolidation station (which has been updated to correspond to the current item), it can be picked by the agent and put to tote 620-4 while the consolidation tote 620-4 is at the put position. For example, the instructions may cause a conveyor or rollers to activate that move the consolidation tote 620-4 from the next in line position 624 to the put position 616.

Likewise, instructions are sent that cause the consolidation tote 620-7, which is associated with the second in line item that has been updated to be the next in line item to move from the queue position 626 to the next in line position 624. For example, the instructions may cause a conveyor or rollers at the queue position 626 to activate and move the consolidation tote. As a current item is put into the tote at the put position, the position of the following items is updated such that the next in line item becomes the current item, the second in line item becomes the next in line item, the third in line item becomes the second in line item, and so forth. Any number or sequence of items may be maintained by the implementations described herein.

In addition to moving consolidation totes between the queue position, the next in line position and the put position, the inventory management system also receives an indication of another item scheduled to be received at the consolidation station 600, and such item will become the second in line item. For example, the inventory management system may receive an indication that an item to be associated with consolidation tote 620-6 will now be the second in line item at the consolidation station 600. Upon receiving such an indication, the inventory management system sends instructions that cause the consolidation tote 620-6 to be transitioned to the queue position 626 so that the consolidation tote 620-6 can continue to progress forward and be positioned at the put position 616 when the corresponding item arrives at the consolidation station 600 as a current item and is put to tote 620-6 when that tote is positioned at the put position 616.

The inventory management system may also determine if the consolidation tote 620-2 that was moved from the put position contains a completed set. If it is determined that the consolidation tote 620-2 does not contain a completed set, instructions are sent that cause the buffer return conveyor 612 to transition the consolidation tote 620-2 back to an available buffer position within the buffer area 614. For example, at each position on the buffer return conveyor adjacent a buffer position, a series of rollers, actuators, or divert mechanisms may be used to divert a consolidation tote from the buffer return conveyor into a buffer position. Because the position of each consolidation tote is maintained, the consolidation tote 620-2 may be moved into any available buffer position.

If it is determined that the consolidation tote 620-2 includes a completed set, instructions are sent that cause the buffer return conveyor 612 to convey the consolidation tote away from the consolidation station toward another station or process. For example, the buffer return conveyor 612, as illustrated, may continue beyond the buffer area toward another process or station.

In another example, if it is determined that the next in line item or the second in line item is to be placed in consolidation tote 620-2, rather than transitioning the consolidation tote 620-2 back to a buffer area, instructions are sent that cause the consolidation tote to be transitioned from the buffer return conveyor 612 to the recirculation position 621 and to either the queue position 626 or the next in line position 624 so that the consolidation tote is placed back into line and returns to the put position at the appropriate time to receive the correct item.

As still another example, if it is determined that the consolidation tote at the put position does not have enough room for the item to be placed in the consolidation tote, the consolidation tote at the put position 616 is determined to be a completed set, transitioned away from the put position 616 and an empty tote is transitioned from the tote destacker 628 to the put position 616 so the item can be put to an empty tote. In other examples, a consolidation tote at any position within the consolidation station 600 may be determined to be a completed set and/or not have enough room for another item to be placed into the consolidation tote. In such an example, the consolidation tote may be transitioned from its current position and either an empty tote placed in that position or an empty tote added to the queue position, or any other position, so that the empty tote will be at the put position when the item arrives at the consolidation station.

For example, it may be determined that an item is anticipated to arrive at the consolidation station for consolidation into consolidation tote 620-1. However, the inventory management system may also determine that the item will not fit in the current consolidation tote 620-1. In such an instance, consolidation tote 620-1 is moved from the buffer position to the buffer return conveyor 612 so that it can be transitioned away from the consolidation station 600. To replace the removed consolidation tote, an empty tote is moved from the tote destacker 628 to the queue position so that the empty tote can be routed to the put position and receive the item when the item arrives at the consolidation station.

Figure 7:
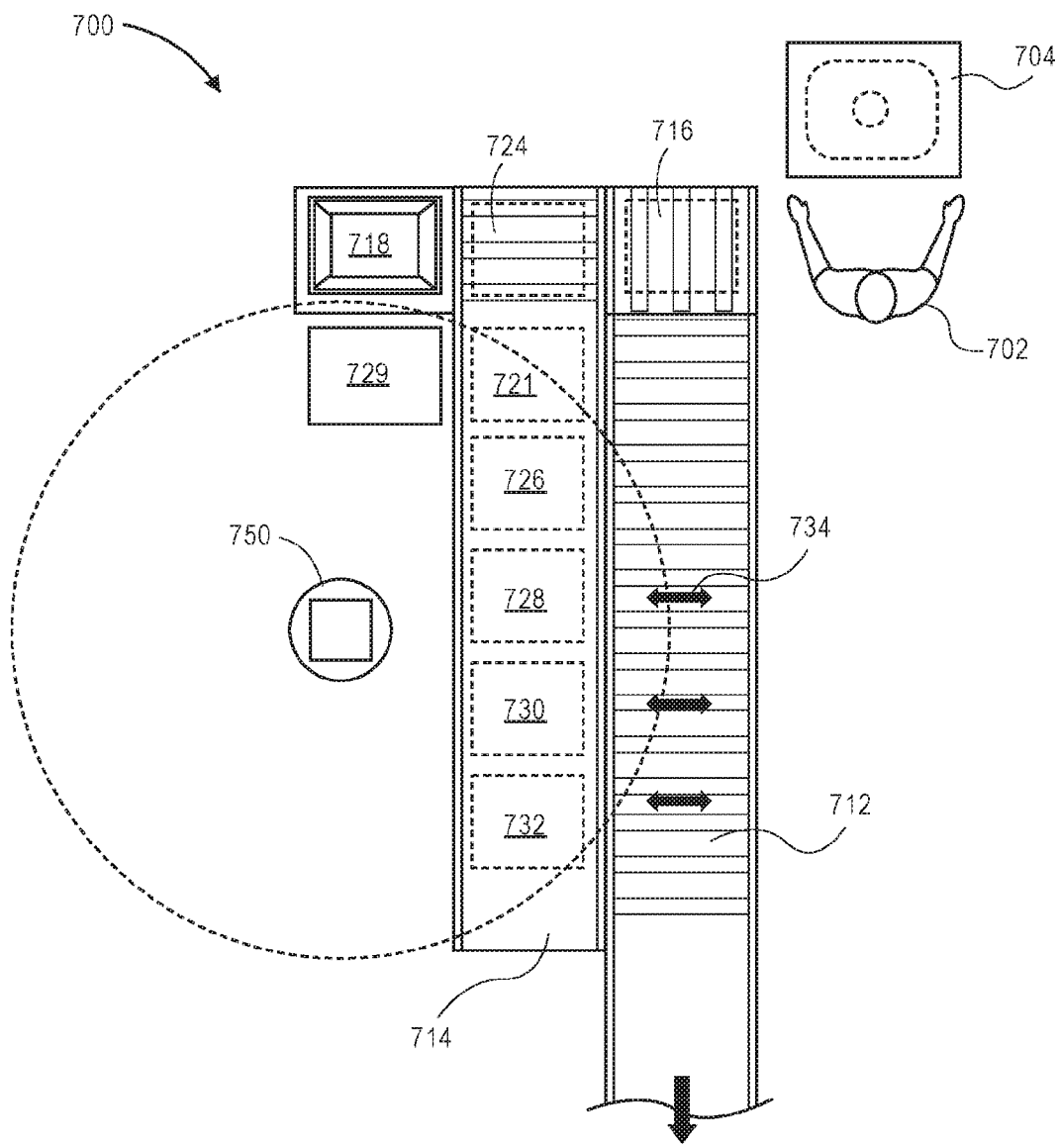
FIG. 7 is top-down view of another item consolidation station, according to an implementation.

FIG. 7 illustrates a top-down view of another consolidation station 700, according to an implementation. To aid in explanation, the totes have been removed from the positions on the conveyors. As illustrated, the consolidation station 700 includes a buffer return conveyor 712, and a buffer area at which consolidation totes are buffered. Six positions, including a put position 716, next in line position 724, queue position 726, and three buffer positions 728, 730, 732 are also included in the consolidation station. Likewise, the consolidation station also includes a recirculation position 721 that may be used to recirculate a consolidation tote that was previously at the put position 716 back to the put position so that another item in the sequence can be put to the tote. The consolidation station may also include a destacker 729 and one or more empty totes at the empty tote position 718. In this implementation, the consolidation station also includes a robotic arm 750 that is used to transition consolidation totes between positions. Similar to the robotic arms discussed above, the robotic arm 750 may be a six-way adjustable robotic arm that is configured to pickup and move consolidation totes. In this example, the robotic arm 750 is at a fixed position and has a range of motion illustrated by the dashed circular lines. In other implementations, the robotic arm may be on a rail system so that it can move within the consolidation station.

As discussed above, with the provided configuration, the agent 702 may pick current item(s) from an inventory holder 704 that arrives at the consolidation station 700 and put the picked current item(s) into a consolidation tote that is positioned at the put position 716. A put to the put position may be done for any item that arrives at the consolidation station 700 and the appropriate consolidation tote is transitioned to the put position prior to the arrival of the current item to be put in the consolidation tote.

During operation, an appropriate tote will be at the put position and the inventory management system will receive an indication of one or more following items that are to arrive at the consolidation station 700. For example, the inventory management system may receive an indication of the following two items to arrive at the consolidation station 700 and a planned sequence of arrival. Based on the received indication of items to arrive at the consolidation station and the scheduled sequence of arrival, the inventory management system determines the consolidation totes into which those items are to be put and sends instructions to the robotic arm 750 that cause the robotic unit to pick the appropriate consolidation tote and put that tote in either the queue position or the next in line position. In other implementations, one or more of the conveyors may include divert mechanisms, such as a right angle transfer, that are activated in response to instructions from the inventory management system to move the consolidation tote in a queue position or the next in line position.

In this example, a mobile drive unit has delivered an inventory holder 704 that includes a current item to be placed in a consolidation tote that is already positioned at the put position 716. In addition to already having the appropriate consolidation tote at the put position 716 for the item put, the inventory management system has received an indication of the following two items (referred to as the next in line item and the second in line item) scheduled to arrive at the consolidation station 700 and sent instructions that caused the consolidation totes into which those items are to be put to be transitioned to the next in line position 724 and the queue position 726.

When the agent 702 puts the current item to the consolidation tote that is at the put position 716, the inventory management system receives an indication of the item put. For example, the agent 702 may scan the tote and/or the item as the item is put to the tote. The scan by the agent 702 may result in a notification signal being sent to the inventory management system indicating that the current item has been put to the tote. As another example, the agent may press a button or other mechanism to generate a signal indicating that the current item has been put to the tote.

Upon receiving an indication that the current item has been put into the consolidation tote at the put position 716, instructions are sent that cause the consolidation tote at the put position 716 to be transitioned from the put position 716 to the buffer return conveyor 712. For example, the put position may include a conveyor or rollers that are activated that cause the consolidation tote to transition from the put position 716 to the buffer return conveyor 712.

In addition to causing the consolidation tote into which the current item was put to transition from the put position 716, the reference or position of the following items are updated such that the next in line item becomes the current item, the second in line item becomes the next in line item and the third in line item becomes the second in line item. Likewise, instructions are sent that cause a consolidation tote at the next in line position 724 to transition from the next in line position 724 to the put position 716 so that when the now current item arrives at the consolidation station 700 it can be picked by the agent 702 and put to the appropriate tote while that consolidation tote is at the put position 716. For example, the instructions may cause a conveyor or rollers to activate that move the consolidation tote from the next in line position 724 to the put position 716.

Likewise, instructions are sent that cause a consolidation tote at the queue position to be transitioned from the queue position to the next in line position 724 because that tote corresponds to what is now the next in line item and will be the next consolidation tote to be transitioned to the put position to receive that item when it arrives at the consolidation station 700. For example, the instructions may cause a conveyor or rollers at the queue position 726 to activate and move the consolidation tote from the queue position 726 to the next in line position 724.

In addition to moving consolidation totes between the queue position, the next in line position and the put position, the inventory management system also receives an indication of another item scheduled to be received at the consolidation station 700. For example, the inventory management system may receive an indication that an item to be associated with a consolidation tote currently at one of the buffer positions 728, 730, 732 will be the new second in line item at the consolidation station 700. Upon receiving such an indication, the inventory management system sends instructions that cause the appropriate consolidation tote to be transitioned from a buffer position to the queue position 726 so that the appropriate consolidation tote can continue to progress forward and be positioned at the put position 716 when the corresponding item arrives at the consolidation station 700. In this example, the inventory management system sends instructions to the robotic arm 750 that cause the robotic arm to pick the appropriate consolidation tote from a buffer position and place the consolidation tote at the queue position 726.

The inventory management system may also determine if the consolidation tote that was moved from the put position contains a completed set. If it is determined that the consolidation tote that was moved from the put position 716 does not contain a completed set, instructions are sent that cause the buffer return conveyor 712 to transition the consolidation tote back to an available buffer position within the buffer area 714. For example, at each position on the buffer return conveyor adjacent a buffer position, a series of rollers, actuators, or divert mechanisms, such as a divert mechanism 734, may be used to divert a consolidation tote from the buffer return conveyor into a buffer position. Because the position of each consolidation tote is maintained, the consolidation tote may be moved into any available buffer position.

If it is determined that the consolidation tote that was moved from the put position 716 includes a completed set, instructions are sent that cause the buffer return conveyor 712 to convey the consolidation tote away from the consolidation station 700 and toward another station, process, or location within the materials handling facility. For example, the buffer return conveyor 712, as illustrated, may continue beyond the buffer area 714 toward another process or station.

In another example, if it is determined that a now next in line item or second in line item to arrive at the consolidation station is to be placed in the consolidation tote that was transitioned from the put position 716, rather than transitioning the consolidation tote back to a buffer position, instructions are sent that cause the consolidation tote that was transitioned from the put position 716 to be transitioned from the buffer return conveyor 712 to the recirculation position 721 and then to either the queue position 726 or the next in line position 724. Transition from the buffer return conveyor to the recirculation position 721 and then to either the queue position 726 or the next in line position 724 may be done using, for example, a conveyor or rollers that are activated and/or the robotic arm 750.

As still another example, if it is determined that the consolidation tote at the put position does not have enough room for the item to be placed in the consolidation tote, the consolidation tote at the put position 716 is transitioned away from the consolidation station 700 and an empty tote is transitioned from the tote destacker and/or the empty tote position 718 to the put position 716 so the item can be put to an empty tote. In other examples, a consolidation tote at any position within the consolidation station 700 may be determined to be a completed set and/or not have enough room for another item to be placed into the consolidation tote. In such an example, the consolidation tote may be transitioned from its current position and either an empty tote placed in that position or an empty tote added to the queue position, or any other position, so that the empty tote will be at the put position when the item arrives at the consolidation station.

For example, it may be determined that an item is anticipated to arrive at the consolidation station for consolidation into a consolidation tote at buffer position 730. However, the inventory management system may also determine that the item will not fit in the consolidation tote currently positioned at buffer position 730. In such an instance, the consolidation tote at buffer position 730 is moved from the buffer position to the buffer return conveyor 712, using a divert mechanism 734, so that it can be transitioned away from the consolidation station 700. To replace the removed consolidation tote, an empty tote is moved from the empty tote position 718 to the next in line position 724 so that the empty tote can be routed to the put position and receive the item when it arrives at the consolidation station. In another implementation, the robotic arm 750 may retrieve an empty tote and place the empty tote at the buffer position 730.

Figure 8:
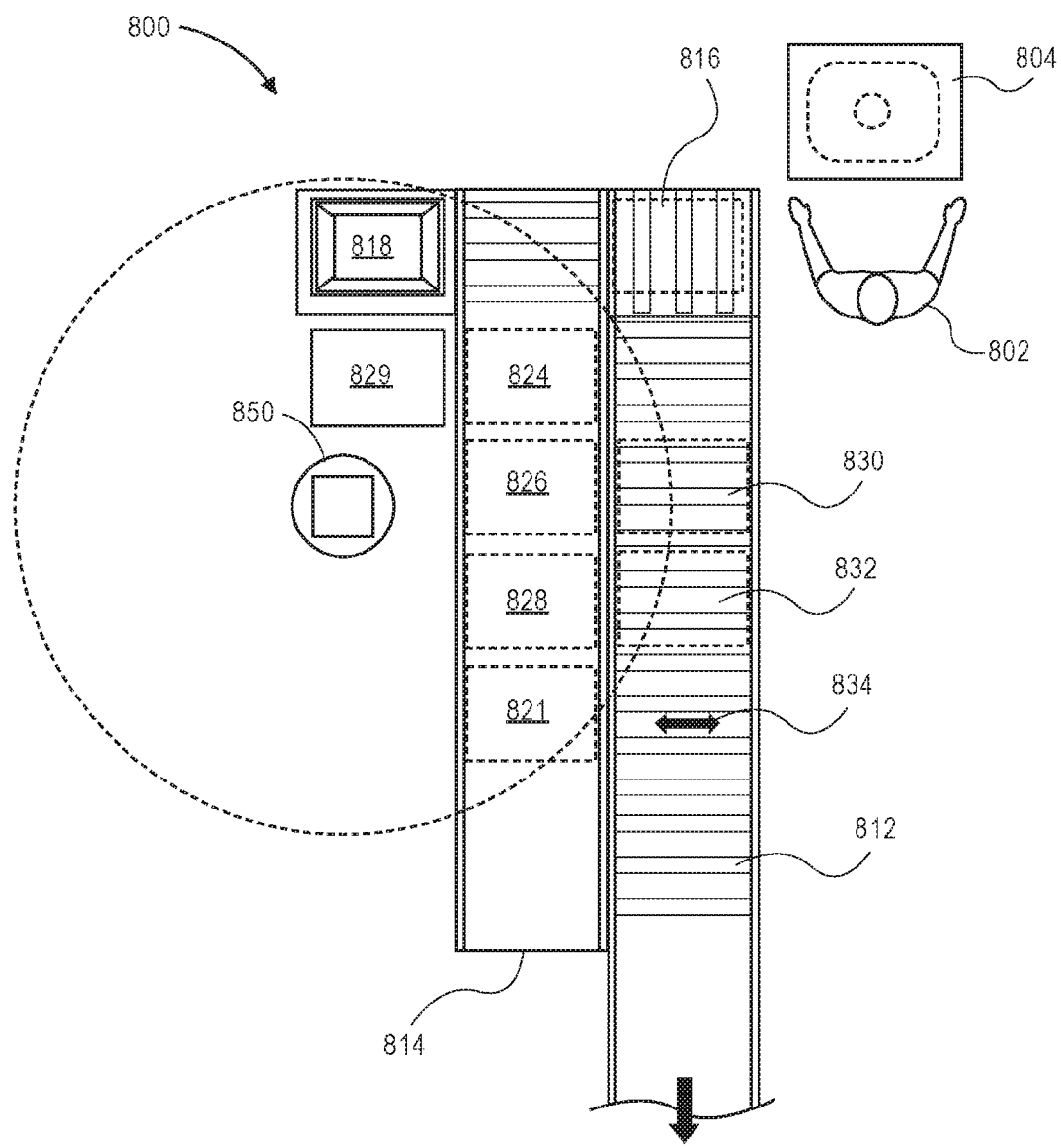
FIG. 8 is top-down view of another item consolidation station, according to an implementation.

FIG. 8 illustrates a top-down view of another consolidation station 800, according to an implementation. To aid in explanation, the totes have been removed from the positions on the conveyors. As illustrated, the consolidation station 800 includes a buffer return conveyor 812 and a buffer area 814 at which consolidation totes are buffered. Six positions, including a put position 816, next in line position 824, queue position 826, and three buffer positions 828, 830, 832 are also included in the consolidation station. Likewise, the consolidation station also includes a recirculation position 821 that may be used to recirculate a consolidation tote that was previously at the put position 816 back to the put position so that another item in the sequence can be put to that tote. The consolidation station 800 may also include a destacker 829 and one or more empty totes at an empty tote position 818. In this implementation, the consolidation station also includes a robotic arm 850 that is used to transition consolidation totes between positions. Similar to the robotic arms discussed above, the robotic arm 850 may be a six-way adjustable robotic arm that is configured to pickup and move consolidation totes. In this example, the robotic arm 850 is at a fixed position and has a range of motion illustrated by the dashed circular lines. In other implementations, the robotic arm may be on a rail system so that it can move within the consolidation station. Like the other example consolidation stations discussed herein, one or more of the conveyors may include divert mechanisms, such as right angle transfers, that may be used as an alternative or in addition to the robotic arm to transition totes between positions.

As discussed above, with the provided configuration, the agent 802 may pick current item(s) from an inventory holder 804 that arrives at the consolidation station 800 and put the picked current item(s) into a consolidation tote that is positioned at the put position 816. A put to the put position may be done for any item that arrives at the consolidation station 800 and the appropriate consolidation tote is transitioned to the put position prior to the arrival of the item to be put in the consolidation tote.

During operation, an appropriate tote will be at the put position and the inventory management system will receive an indication of one or more following items that are to arrive at the consolidation station 800. For example, the inventory management system may receive an indication of the next two items, referred to herein as a next in line item and a second in line item, to arrive at the consolidation station 800. Based on the received indication of items to arrive at the consolidation station and the scheduled sequence of arrival, the inventory management system determines the consolidation totes into which those items are to be put and sends instructions to the robotic arm 850 that cause the robotic unit to pick the appropriate consolidation tote(s) and put that tote(s) in either the next in line position, for the next in line item, or the queue position, for the second in line item.

In this example, a mobile drive unit has delivered an inventory holder 804 that includes a current item to be placed in a tote that is already positioned at the put position 816. In addition to already having the appropriate consolidation tote at the put position 816 for the item put, the inventory management system has received an indication of the following two items scheduled to arrive at the consolidation station 800 and sent instructions that caused the consolidation totes into which those items are to be put to be transitioned to the next in line position 824 and the queue position 826.

When the agent 802 puts the current item to the consolidation tote that is at the put position 816, the inventory management system receives an indication of the item put. For example, the agent 802 may scan the tote and/or the item as the item is put to the tote. The scan by the agent 802 may result in a notification signal that is sent to the inventory management system indicating that the item has been put to the tote. As another example, the agent may press a button or other mechanism to generate a signal that the item has been put to the tote.

Upon receiving an indication that the current item has been put into the consolidation tote at the put position 816, instructions are sent that cause the consolidation tote at the put position 816 to be transitioned from the put position 816 to the buffer return conveyor 812. For example, the put position may include a conveyor or rollers that are activated that cause the consolidation tote to transition from the put position 816 to the buffer return conveyor 812.

In addition to causing the consolidation tote into which the current item was put to transition from the put position 816, the reference of position of the following items are updated such that the next in line item becomes the current item, the second in line item becomes the next in line item and the third in line item becomes the second in line item. Likewise, instructions are sent that cause a consolidation tote at the next in line position 824 to transition from the next in line position 824 to the put position 816 so that when the now current item arrives at the consolidation station 800 it can be picked by the agent 802 and put to the appropriate tote while that consolidation tote is at the put position 816. For example, the instructions may cause a conveyor or rollers to activate that move the consolidation tote from the next in line position 824 to the put position 816.

Likewise, instructions are sent that cause a consolidation tote at the queue position to be transitioned from the queue position 826 to the next in line position 824 because that tote corresponds to what is now the next in line item and will be the next consolidation tote to be transitioned to the put position to receive the item when it arrives at the consolidation station 800. For example, the instructions may cause the robotic arm 850 to pick the consolidation tote from the queue position 826 and move the consolidation tote to the next in line position 824. Alternatively, the instructions may cause a conveyor or rollers at the queue position 826 to activate and move the consolidation tote from the queue position 826 to the next in line position 824.

In addition to moving consolidation totes between the queue position, the next in line position and the put position, the inventory management system also receives an indication of another item scheduled to be received at the consolidation station 800. For example, the inventory management system may receive an indication that an item to be associated with a consolidation tote currently at one of the buffer positions 828, 830, or 832 will be the new second in line item at the consolidation station 800. Upon receiving such an indication, the inventory management system sends instructions that cause the appropriate consolidation tote to be transitioned from a buffer position to the queue position 826 so that the appropriate consolidation tote can continue to progress forward and be positioned at the put position 816 when the corresponding item arrives at the consolidation station 800. In this example, the inventory management system sends instructions to the robotic arm 850 that cause the robotic arm to pick the appropriate consolidation tote from a buffer position and place the consolidation tote at the queue position 826.

The inventory management system may also determine if the consolidation tote that was moved from the put position contains a completed set. If it is determined that the consolidation tote that was moved from the put position 816 does not contain a completed set, instructions are sent that cause the buffer return conveyor 812 to transition the consolidation tote back to an available buffer position within the buffer area 814. In this example two of the buffer positions are on the buffer return conveyor and one of the buffer positions is on the infeed conveyor. In such a configuration, as the consolidation tote is moved from the put position to the buffer return conveyor, a consolidation tote at buffer position 830 is moved by the buffer return conveyor to buffer position 832 and the consolidation tote at buffer position 832 is moved to a recirculation position 821. For example, divert mechanisms 834 may be positioned on the buffer return conveyor that diverts consolidation totes that do not include completed sets to the recirculation position 821. The recirculation position may likewise include a conveyor or rollers that cause the consolidation tote to transition from the recirculation position 821 to buffer position 828. Alternatively, the robotic arm 850 may pick the consolidation tote from either the buffer return conveyor or the recirculation position and place the tote at an available buffer position. Because the position of each consolidation tote is maintained, the consolidation tote may be moved into any available buffer position.

If it is determined that the consolidation tote that was moved from the put position 816 includes a completed set, instructions are sent that cause the buffer return conveyor 812 to convey the consolidation tote away from the consolidation station 800 and toward another station, process, or location within the materials handling facility. For example, the buffer return conveyor 812, as illustrated, may continue beyond the buffer area 814 toward another process or station. As the buffer return conveyor progresses, the consolidation tote with the completed set passes the buffer positions and continues away from the consolidation station.

In another example, if it is determined that a now next in line or second in line item to arrive at the consolidation station is to be placed in the consolidation tote that was transitioned from the put position 816, rather than transitioning the consolidation tote back to a buffer position, instructions are sent that cause the robotic arm 850 to pick the consolidation tote that was transitioned from the put position 816 from the buffer return conveyor and place the consolidation tote at either the next in line position 824 or the queue position 826.

As still another example, if it is determined that the consolidation tote at the put position does not have enough room for the item to be placed in the consolidation tote, the consolidation tote at the put position 816 is transitioned away from the put position 816 and an empty tote is transitioned from the tote destacker 829 and/or the empty tote position 818 to the put position 816 so the item can be put to an empty tote.

Figure 9:
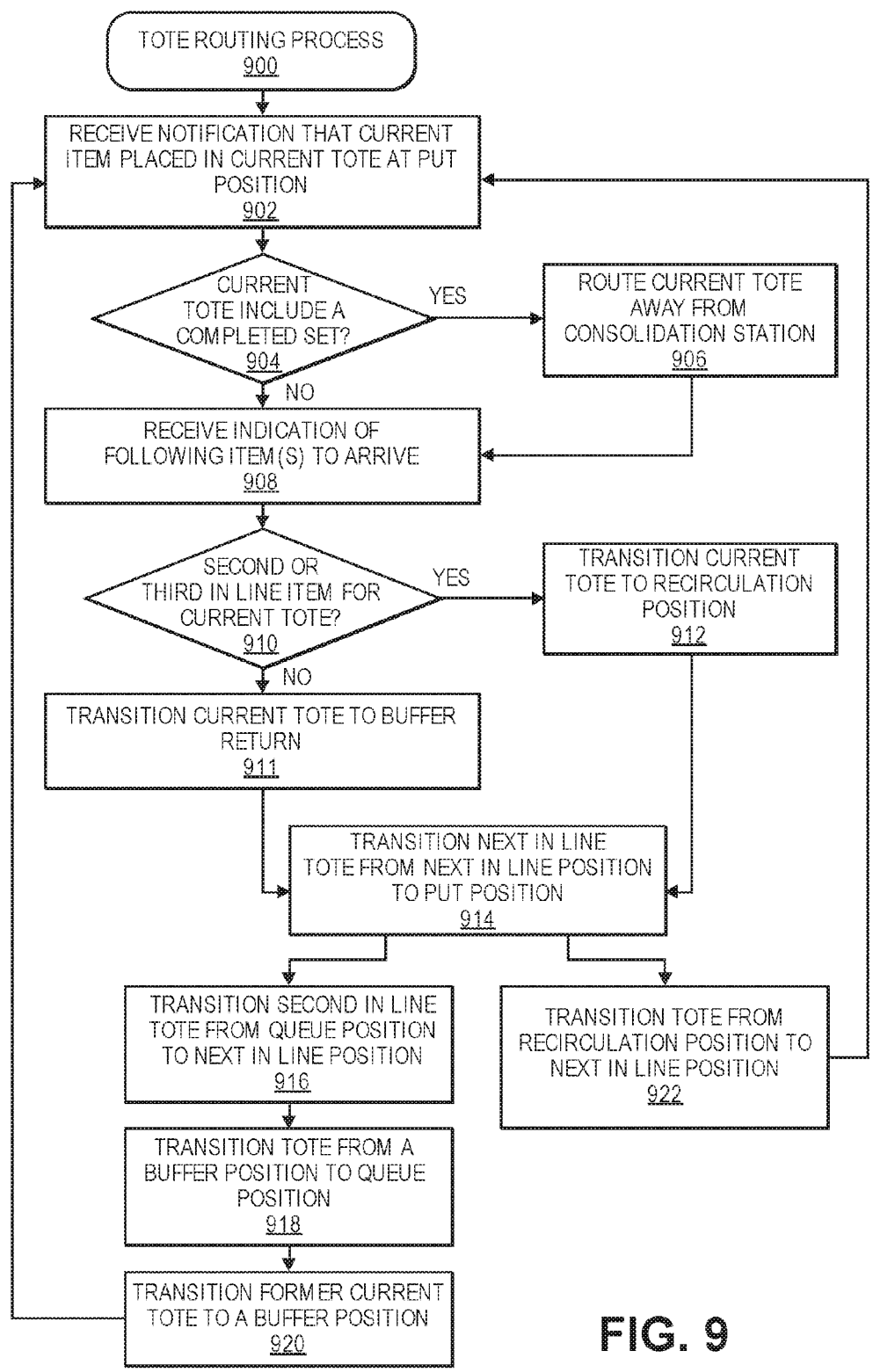
FIG. 9 is a flow diagram illustrating another example item consolidation process, according to an implementation.

FIG. 9 is a flow diagram of an example consolidation station tote routing process 900, according to an implementation. The example process may be performed with respect to a consolidation station and may include an inventory management system generating instructions that cause components of the consolidation station, such as conveyors, actuators, rollers, divert mechanisms, robotic arms, etc., to perform specific actions. For purposes of this example, the consolidation totes will be referred to herein as a current tote, a next in line tote, and a second in line tote. Likewise, this example references a current item, next in line item, second in line item, and third in line item. However, it will be appreciated that each of the current item, next in line item, second in line item, and third in line item may actually be one or more items that are being picked, put, and consolidated. While we describe movement of four totes and four items in this example discussion, it will be appreciated that additional or fewer totes and/or additional or fewer items may be transitioned or consolidated within a consolidation station using the example process. Likewise, the example process 900 may continue until all items have been processed and consolidated.

The example process 900 begins upon receipt of a notification that a current item has been placed in a current tote at a put position, as in 902. As discussed above, a current item may be delivered or otherwise arrive at the consolidation station for consolidation with other items maintained in a consolidation tote at the consolidation station. For example, a mobile drive unit may deliver to the consolidation station an inventory holder that contains a current item to be consolidated. An agent at the consolidation station may pick the current item from the inventory holder and put the current item to the current consolidation tote positioned at the put position.

Upon receiving the notification that the current item has been put to current tote, a determination is made as to whether the current tote includes a completed set, as in 904. As discussed above, a consolidation tote may be considered to include a completed set if, for example, the consolidation tote is full, all items of a shipment set have been placed into the consolidation tote, etc.

If it is determined that current tote includes a completed set, the tote is routed away from the consolidation station and to another process, station, etc. within the materials handling facility, as in 906. In some implementations, a determination is also made as to whether the next in line item, which will be the current item following the put of the current item into the current tote, is to be put into the same tote. In such an example, the indication of the items is updated (i.e., the next in line item becomes the current item, the second in line item becomes the next in line item, etc.). However, the totes do not transition and the current tote remains the current tote and remains at the put position so that the now current item can be put into the correct tote.

If it is determined that the current tote does not include a completed set, or upon routing the current tote away from the consolidation station, an indication of following items to arrive at the consolidation station is received, as in 908. For example, a computing system that controls and organizes the picking of items from inventory may provide information to the example process 900 indicating items that are or will be arriving at the consolidation station, along with sequencing information indicating a sequence or order in which those items will arrive.

Based on received indication of following items to arrive, a determination is made as to whether the second in line item to be received is to be put in the current tote, as in 910. As discussed above, items may be received in any order and the consolidation totes at the consolidation station are transitioned such that the appropriate consolidation tote is at the put position when each item arrives so that the item can be put to the appropriate tote without the agent having to determine into which tote the item is to be placed. The agent simply puts the item to the tote that is at the put position.

If it is determined that the second in line item is to be put to the current tote, the current tote is transitioned from the put position to a recirculation position, as in 912. If the current tote was determined to be a complete set, an empty tote may be utilized to replace the current tote as it is transitioned within the consolidation station. If it is determined that the second in line item is not to be transitioned to the current tote (and the current tote was determined not to include a completed set), the current tote is transitioned from the put position to a buffer return conveyor, as in 911.

After transitioning the current tote to either a buffer return conveyor or to a recirculation position, the next in line tote is transitioned from the next in line position to the put position and becomes the current tote, as in 914. The next in line tote is transitioned from the next in line position to the put position and becomes the current tote because the next in line item, which is now the current item to arrive at the consolidation station is to be put into that consolidation tote.

If it was determined that the second in line item, which is now the next in line item, is to be put in what was the current tote that was transitioned from the put position to the recirculation position at block 912, that tote is transitioned from the recirculation position to the next in line position, as in 922. Alternatively, if it was determined at block 910 that the previously current tote that was transitioned from the put position to the recirculation position is to receive the third in line item, which is now the second in line item, that tote is transitioned from the recirculation position to the next in line position at block 922.

Upon transitioning the previously current tote from the recirculation position to either the next in line position, in which it becomes the next in line tote, or to the second in line position, in which it becomes the second in line tote, the example process 900 returns to block 902 and continues.

Returning to block 914, if it was determined that the second in line item, which is now the next in line item is not to be put in previously current tote, the second in line tote is transitioned from the queue position to the next in line position and becomes the next in line tote, as in 916. A determination may also be made as to which consolidation tote that is in the buffer position corresponds to a new second in line item to be received at the consolidation station and that tote is transitioned from the respective buffer position to the queue position and becomes the new second in line tote, as in 918. In addition, the previously current tote that was transitioned from the put position to the buffer return conveyor, at block 911, is transitioned from the buffer return conveyor to any available buffer position, as in 920, and the example process returns to block 902 and continues.

The example process 900 may continue transitioning consolidation totes from buffer positions to queue positions, to next in line positions, to put positions, and back to buffer positions for each item that is to be received at the consolidation station so that an agent may perform every put to the put position, regardless of the tote into which the item is to be put. The transitioning of consolidation totes increases throughput of items through the consolidation station and decreases the error rate of items being put to the wrong tote. Specifically, throughput is increased and errors are decreased because each item is put to the same put position and the appropriate tote is transitioned to the put position before the item arrives at the consolidation station so that the item can be properly put to the correct consolidation tote.

Various operations of an inventory management system, such as those described herein, may be executed on one or more computer systems, interacting with various other devices in a materials handling facility, according to various implementations. For example, the inventory management system discussed above may function and operate on one or more computer systems. One such computer system is illustrated by the block diagram in FIG. 10. In the illustrated implementation, a computer system 1000 includes one or more processors 1010A, 1010B through 1010N, coupled to a non-transitory computer-readable storage medium 1020 via an input/output (I/O) interface 1030. The computer system 1000 further includes a network interface 1040 coupled to the I/O interface 1030, and one or more input/output devices 1050. In some implementations, it is contemplated that a described implementation may be implemented using a single instance of the computer system 1000 while, in other implementations, multiple such systems or multiple nodes making up the computer system 1000 may be configured to host different portions or instances of the described implementations. For example, in one implementation, some data sources or services (e.g., routing, position tracking, consolidation instructions, pick instructions, and place instructions) may be implemented via one or more nodes of the computer system 1000 that are distinct from those nodes implementing other data sources or services.

In various implementations, the computer system 1000 may be a uniprocessor system including one processor 1010A, or a multiprocessor system including several processors 1010A-1010N (e.g., two, four, eight, or another suitable number). The processors 1010A-1010N may be any suitable processor capable of executing instructions. For example, in various implementations, the processors 1010A-1010N may be general-purpose or embedded processors implementing any of a variety of instruction set architectures (ISAs), such as the x86, PowerPC, SPARC, or MIPS ISAs, or any other suitable ISA. In multiprocessor systems, each of the processors 1010A-1010N may commonly, but not necessarily, implement the same ISA.

The non-transitory computer-readable storage medium 1020 may be configured to store executable instructions and/or data accessible by the one or more processors 1010A-1010N. In various implementations, the non-transitory computer-readable storage medium 1020 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 1020 as program instructions 1025 and data storage 1035, respectively. In other implementations, program instructions and/or data may be received, sent or stored upon different types of computer-accessible media, such as non-transitory media, or on similar media separate from the non-transitory computer-readable storage medium 1020 or the computer system 1000. Generally speaking, a non-transitory, computer-readable storage medium may include storage media or memory media such as magnetic or optical media, e.g., disk or CD/DVD-ROM coupled to the computer system 1000 via the I/O interface 1030. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 1040.

In one implementation, the I/O interface 1030 may be configured to coordinate I/O traffic between the processors 1010A-1010N, the non-transitory computer-readable storage medium 1020, and any peripheral devices, including the network interface 1040 or other peripheral interfaces, such as input/output devices 1050. In some implementations, the I/O interface 1030 may perform any necessary protocol, timing or other data transformations to convert data signals from one component (e.g., non-transitory computer-readable storage medium 1020) into a format suitable for use by another component (e.g., processors 1010A-1010N). In some implementations, the I/O interface 1030 may include support for devices attached through various types of peripheral buses, such as a variant of the Peripheral Component Interconnect (PCI) bus standard or the Universal Serial Bus (USB) standard, for example. In some implementations, the function of the I/O interface 1030 may be split into two or more separate components, such as a north bridge and a south bridge, for example. Also, in some implementations, some or all of the functionality of the I/O interface 1030, such as an interface to the non-transitory computer-readable storage medium 1020, may be incorporated directly into the processors 1010A-1010N.

The network interface 1040 may be configured to allow data to be exchanged between the computer system 1000 and other devices attached to a network, such as other computer systems, robots (e.g., buffer robot, and consolidation robot), or between nodes of the computer system 1000. In various implementations, the network interface 1040 may support communication via wired or wireless general data networks, such as any suitable type of Ethernet network.

Input/output devices 1050 may, in some implementations, include one or more displays, projection devices, audio output devices, keyboards, keypads, touchpads, scanning devices, voice or optical recognition devices, or any other devices suitable for entering or retrieving data by one or more computer systems 1000. Multiple input/output devices 1050 may be present in the computer system 1000 or may be distributed on various nodes of the computer system 1000. In some implementations, similar input/output devices may be separate from the computer system 1000 and may interact with one or more nodes of the computer system 1000 through a wired or wireless connection, such as over the network interface 1040.

Figure 10:
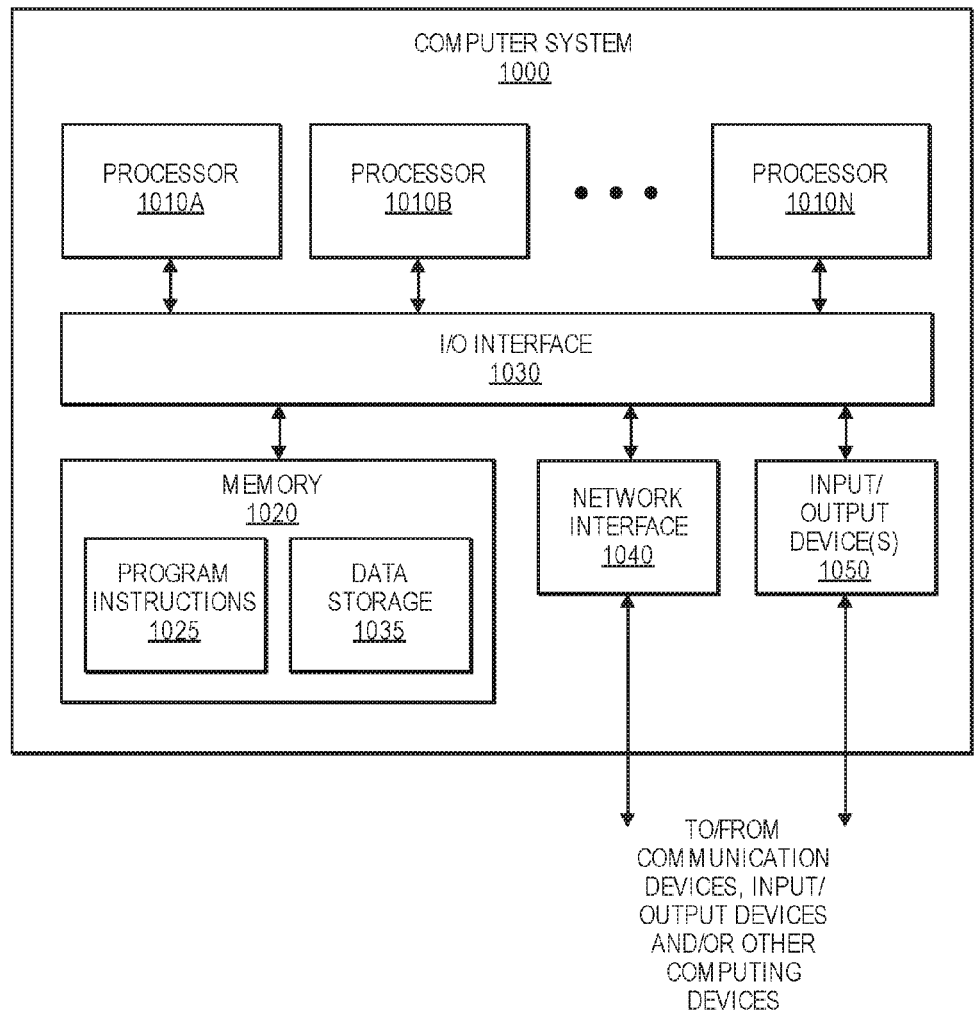
FIG. 10 is a block diagram illustrating an example computer system, according to an implementation.

As shown in FIG. 10, the memory 1020 may include program instructions 1025 that may be configured to implement one or more of the described implementations and/or provide data storage 1035, which may comprise various tables, data stores and/or other data structures accessible by the program instructions 1025. The data storage 1035 may include various data stores for maintaining one or more consolidation set, item, and/or tote positions within a consolidation station, data representing physical characteristics of items and/or other item parameter values, data representing dimensions of totes, etc.

Those skilled in the art will appreciate that the computing system 1000 is merely illustrative and is not intended to limit the scope of implementations. In particular, the computing system and devices may include any combination of hardware or software that can perform the indicated functions, including computers, network devices, internet appliances, robotic devices, etc. The computing system 1000 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some implementations, the functionality provided by the methods, systems, and apparatus discussed above may be provided in alternative ways, such as being split among more software modules or routines or consolidated into fewer modules or routines, and/or being split into additional or fewer robotic units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer-implemented method for consolidating items of a shipment set, comprising:
    under control of one or more processors configured with instructions for consolidating items of a shipment set, the instructions when executed by the one or more processors causing the one or more processors to at least:
    determine an item;
    determine a shipment set associated with the item;
    determine that the item is placed at an initial position on an item conveyor, wherein the item conveyor includes a plurality of positions between an initial position on the item conveyor and a consolidation position on the item conveyor;
    determine a buffer position of a consolidation tote associated with the shipment set;
    cause a first robot to pick the consolidation tote from the buffer position and place the consolidation tote at an initial position on a consolidation conveyor, wherein the initial position on the item conveyor corresponds to the initial position on the consolidation conveyor;
    cause the item conveyor to convey the item from the initial position on the item conveyor to the consolidation position on the item conveyor;
    cause the consolidation conveyor to convey the consolidation tote from the initial position on the consolidation conveyor to a consolidation position on the consolidation conveyor, wherein the item conveyor and the consolidation conveyor convey the item and the consolidation tote in a sequenced manner; and cause a second robot to transition the item from an item tote to the consolidation tote.

2. The computer-implemented method of claim 1, wherein the consolidation tote includes a second item associated with the shipment set.

3. The computer-implemented method of claim 1, wherein:

the consolidation conveyor includes a plurality of positions between the initial position on the consolidation conveyor and the consolidation position on the consolidation conveyor; and a number of the plurality of positions between the initial position on the item conveyor and the consolidation position on the item conveyor is a same number of positions as the plurality of positions between the initial position on the consolidation conveyor and the consolidation position on the consolidation conveyor.

4. The computer-implemented method of claim 1, further comprising:

under control of the one or more processors configured with instructions for consolidating items of a shipment set, the instructions when executed by the one or more processors causing the one or more processors to at least:

determine that the shipment set associated with the consolidation tote is complete; and cause the second robot to move the consolidation tote to a completed consolidation conveyor, wherein the completed consolidation conveyor is configured to convey the consolidation tote away from the second robot.

5. The computer-implemented method of claim 1, further comprising:

under control of the one or more processors configured with instructions for consolidating items of a shipment set, the instructions when executed by the one or more processors causing the one or more processors to at least:

determine that the shipment set associated with the consolidation tote is not complete;

cause the second robot to move the consolidation tote to a partial consolidation return conveyor, wherein the partial consolidation return conveyor is configured to convey the consolidation tote away from the second robot;

cause the first robot to pick the consolidation tote from the partial consolidation return conveyor; and cause the first robot to place the consolidation tote in a second buffer position.

6. The computer-implemented method of claim 5, wherein the second buffer position is randomly selected from a plurality of available buffer positions accessible to the first robot.

7. A consolidation station, comprising:

a first conveyor configured to convey an item towards a consolidation position associated with the first conveyor;

a second conveyor configured to convey a consolidation tote toward a consolidation position associated with the second conveyor;

a first robot positioned adjacent the second conveyor and configured to place the consolidation tote on the second conveyor; and a second robot positioned adjacent the consolidation position associated with the first conveyor and positioned adjacent the consolidation position associated with the second conveyor, wherein the second robot is configured to pick the item when the item is at the consolidation position associated with the first conveyor and place the item in the consolidation tote when the consolidation tote is at the consolidation position associated with the second conveyor.

8. The consolidation station of claim 7, further comprising:

a third conveyor configured to convey the consolidation tote away from the second robot.

9. The consolidation station of claim 8, wherein the second robot is further configured to pick the consolidation tote from the consolidation position associated with the second conveyor and place the consolidation tote on the third conveyor.

10. The consolidation station of claim 8, wherein the first robot is further configured to pick the consolidation tote from the third conveyor as the consolidation tote is conveyed away from the second robot.

11. The consolidation station of claim 7, further comprising:

a buffer wall containing a plurality of buffer slots, at least one of the plurality of buffer slots of a size sufficient to store the consolidation tote.

12. The consolidation station of claim 11, wherein the first robot is further configured to:

pick the consolidation tote; and place the consolidation tote into the at least one of the plurality of buffer slots.

13. The consolidation station of claim 12, wherein the at least one buffer slot is randomly selected from the plurality of buffer slots.

14. The consolidation station of claim 7, wherein:

the item is within an item tote when positioned on the first conveyor; and the second robot is configured to pick the item when the item is at the consolidation position associated with the first conveyor by picking the item tote when the item tote is at the consolidation position associated with the first conveyor.

15. The consolidation station of claim 7, further comprising:

a chute positioned adjacent the second robot, the chute configured to receive a second item; and wherein the second robot is further configured to:

pick the second item from the first conveyor when the second item is at the consolidation position associated with the first conveyor; and place the second item on the chute.

16. A system, comprising:

a first conveyor configured to convey item totes toward a consolidation position associated with the first conveyor;

a second conveyor configured to convey consolidation totes toward a consolidation position associated with the second conveyor;

a first robot positioned adjacent the second conveyor and configured to place consolidation totes on the second conveyor; and a second robot positioned adjacent the consolidation position associated with the first conveyor and positioned adjacent the consolidation position associated with the second conveyor;

a non-transitory computer readable storage medium storing instructions for consolidating items of a shipment set, the instructions when executed by a processor causing the processor to at least:
  determine a shipment set associated with an item positioned at an initial position on the first conveyor;
  determine a consolidation tote associated with the shipment set;
  send instructions that cause the first robot to place the consolidation tote at a position on the second conveyor, wherein the position on the second conveyor corresponds with the initial position on the first conveyor;
  send instructions that cause the first conveyor to convey the item to the consolidation position associated with the first conveyor;
  send instructions that cause the second conveyor to convey the consolidation tote to the consolidation position associated with the second conveyor; and
  send instructions that cause the second robot to transfer the item from the consolidation position associated with the first conveyor into the consolidation tote at the consolidation position associated with the second conveyor.

17. The system of claim 16, further comprising:
a third conveyor configured to convey consolidation totes away from the second robot; and
wherein the instructions when executed by the processor further cause the processor to at least:
  determine that all items associated with the shipment set are in the consolidation tote; and
  send instructions that cause the second robot to move the consolidation tote from the consolidation position associated with the second conveyor to the third conveyor.

18. The system of claim 16, further comprising:
a third conveyor configured to convey consolidation totes away from the second robot;
a buffer wall including a plurality of slots, each slot configured to store a consolidation tote; and
wherein the instructions when executed by the processor further cause the processor to at least:
  determine that all items associated with the shipment set are not in the consolidation tote;
  send instructions that cause the second robot to move the consolidation tote from the consolidation position associated with the second conveyor to the third conveyor; and
  send instructions that cause the first robot to pick the consolidation tote from the third conveyor and place the consolidation tote in a slot of the buffer wall.

19. The system of claim 18, wherein the slot is randomly selected from a plurality of available slots of the buffer wall.

20. The system of claim 16, wherein the instructions that when executed to cause the processor to determine a shipment set associated with the item, further include instructions that when executed cause the processor to at least:
  determine that no consolidation tote is associated with the shipment set;
  pick an empty tote from an empty tote stack; and
  associate the empty tote with the shipment set.

* * * * *